US011422638B2

(12) United States Patent
Mutlu et al.

(10) Patent No.: US 11,422,638 B2
(45) Date of Patent: Aug. 23, 2022

(54) INPUT DEVICES THAT USE SELF-MIXING INTERFEROMETRY TO DETERMINE MOVEMENT WITHIN AN ENCLOSURE

(71) Applicant: Apple Inc., Cupertino, CA (US)

(72) Inventors: Mehmet Mutlu, Stanford, CA (US); Yuhao Pan, Sunnyvale, CA (US); Stephen E. Dey, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 16/883,390

(22) Filed: May 26, 2020

(65) Prior Publication Data

US 2021/0011559 A1 Jan. 14, 2021

Related U.S. Application Data

(60) Provisional application No. 62/871,357, filed on Jul. 8, 2019.

(51) Int. Cl.
*G06F 3/01* (2006.01)
*G06F 3/03* (2006.01)
(Continued)

(52) U.S. Cl.
CPC .............. *G06F 3/0304* (2013.01); *G01L 1/24* (2013.01); *G01P 13/00* (2013.01)

(58) Field of Classification Search
CPC ........ G06F 3/0304; G06F 3/017; G06F 3/011; G01L 1/24; G01P 13/00; G01P 13/04
See application file for complete search history.

(56) References Cited

U.S. PATENT DOCUMENTS 4,746,770 A * 5/1988 McAvinney .......... G06F 3/0421
250/221
5,914,704 A * 6/1999 Yamada ................. G06F 3/011
345/157
(Continued)

FOREIGN PATENT DOCUMENTS

DE 102016211983 1/2018
WO WO-9930311 A1 * 6/1999 ............. G04B 47/00
(Continued)

OTHER PUBLICATIONS

Liess et al., "A miniaturized multidirectional optical motion sensor and input device based on laser self-mixing," Measurement Science and Technology, Institute of Physics Publishing, Bristol, GB, 2002, vol. 13, No. 12, pp. 2001-2006.

*Primary Examiner* — Grant Sitta
*Assistant Examiner* — Joseph P Fox
(74) *Attorney, Agent, or Firm* — Brownstein Hyatt Farber Schreck, LLP

(57) ABSTRACT

An input device includes an enclosure defining a three-dimensional input space and one or more self-mixing interferometry sensors coupled to the enclosure and configured to produce a self-mixing interferometry signal resulting from reflection of backscatter of emitted light by a body part in the three-dimensional input space. In various examples, movement of the body part may be determined using the self-mixing interferometry signal, which may in turn be used to determine an input. In some examples, a body part displacement or a body part speed and an absolute distance to the body part may be determined using the self-mixing interferometry signal and used to determine an input. In a number of examples, multiple self-mixing interferometry sensors may be used and the movement may be determined by
(Continued)

analyzing differences between the respective produced self-mixing interferometry signals.

20 Claims, 17 Drawing Sheets

(51) Int. Cl.
    *G01P 13/00*     (2006.01)
    *G01L 1/24*     (2006.01)
    *A63F 13/211*     (2014.01)

(56) References Cited

U.S. PATENT DOCUMENTS

| | | | |
|---|---|---|---|
| 6,178,001 | B1 | 1/2001 | Kim |
| 7,126,586 | B2 | 10/2006 | Jianping et al. |
| 7,535,578 | B2 | 5/2009 | Pril |
| 7,880,732 | B2 * | 2/2011 | Goertz ................ G06F 3/0421 |
| | | | 178/18.09 |
| 8,416,424 | B2 | 4/2013 | Werner |
| 8,945,017 | B2 | 2/2015 | Venkatraman et al. |
| 9,880,632 | B2 | 1/2018 | Ataee et al. |
| 9,912,923 | B2 | 3/2018 | Kilcher et al. |
| 10,126,779 | B2 | 11/2018 | von Badinski et al. |
| 10,317,940 | B2 | 6/2019 | Eim |
| 10,379,028 | B2 | 8/2019 | Spruit et al. |
| 10,401,901 | B2 | 9/2019 | Park |
| 10,478,127 | B2 | 11/2019 | Sampson |
| 10,768,693 | B2 | 9/2020 | Powderly et al. |
| 2002/0104957 | A1 | 8/2002 | Liess |
| 2007/0077900 | A1 | 4/2007 | Grunhlke |
| 2008/0188726 | A1 | 8/2008 | Presura |
| 2008/0200781 | A1 | 8/2008 | Van Herpen |
| 2010/0081900 | A1 | 4/2010 | Price |
| 2010/0134803 | A1 | 6/2010 | Baier |
| 2010/0253634 | A1 * | 10/2010 | Lin ...................... G06F 3/0202 |
| | | | 345/173 |
| 2010/0328680 | A1 | 12/2010 | Moench et al. |
| 2011/0105874 | A1 | 5/2011 | Feddes |
| 2012/0120375 | A1 | 5/2012 | Kilcher |
| 2012/0160031 | A1 | 6/2012 | Van Steenberge |
| 2012/0200858 | A1 | 8/2012 | Pruijmboom |
| 2013/0053696 | A1 | 2/2013 | Hasgawa-Johnson |
| 2014/0085635 | A1 | 3/2014 | Van Der Lee |
| 2015/0286293 | A1 | 10/2015 | Gruhlke et al. |
| 2016/0062473 | A1 | 3/2016 | Bouchat et al. |
| 2016/0120468 | A1 | 5/2016 | Mathew |
| 2016/0320173 | A1 | 11/2016 | Royo Royo |
| 2017/0085688 | A1 | 3/2017 | Zhou |
| 2017/0090581 | A1 | 3/2017 | Pothier |
| 2017/0094389 | A1 | 3/2017 | Saulsbury |
| 2017/0248422 | A1 | 8/2017 | Najafi |
| 2018/0115439 | A1 | 4/2018 | Bhatti |
| 2018/0157342 | A1 | 6/2018 | Romano |
| 2018/0310891 | A1 | 11/2018 | Fine |
| 2019/0004604 | A1 | 1/2019 | Wang et al. |
| 2019/0034072 | A1 | 1/2019 | Chiu |
| 2019/0056498 | A1 | 2/2019 | Sonn |
| 2019/0285753 | A1 | 9/2019 | Spruit |
| 2019/0324536 | A1 | 10/2019 | Forest et al. |
| 2019/0332140 | A1 | 10/2019 | Wang |
| 2019/0357771 | A1 | 11/2019 | Yu |
| 2020/0200522 | A1 | 6/2020 | Huang |
| 2020/0264311 | A1 | 8/2020 | Le Dortz et al. |
| 2021/0072833 | A1 | 3/2021 | Mutlu et al. |
| 2021/0085245 | A1 | 3/2021 | Cihan et al. |

FOREIGN PATENT DOCUMENTS

| | | |
|---|---|---|
| WO | WO 03/102625 | 12/2003 |
| WO | WO 08/055640 | 5/2008 |
| WO | WO 09/004559 | 1/2009 |

* cited by examiner

INPUT DEVICES THAT USE SELF-MIXING INTERFEROMETRY TO DETERMINE MOVEMENT WITHIN AN ENCLOSURE

This application is a nonprovisional of and claims the benefit under 35 U.S.C. § 119(e) of U.S. Provisional Patent Application No. 62/871,357, filed Jul. 8, 2019, the contents of which are incorporated herein by reference as if fully disclosed herein.

FIELD

The described embodiments relate generally to input devices. More particularly, the present embodiments relate to input devices that use self-mixing interferometry to determine movement within an enclosure.

BACKGROUND

Electronic devices use a variety of different input devices to obtain input from users. Examples of such input devices include keyboards, computer mice, track pads, touch screens, force sensors, touch sensors, track balls, microphones, buttons, dials, switches, sliders, cameras, and so on.

Different input devices are suited to different applications. For example, keyboards may not be suitable to use with portable devices. Many input devices may involve a user touching a surface that is configured to receive input, such as a touch screen. Such an input device may be less suited to applications where a user may be touching another surface.

SUMMARY

The present disclosure relates to an input device including an enclosure defining a three-dimensional input space and one or more self-mixing interferometry sensors coupled to the enclosure and configured to produce a self-mixing interferometry signal resulting from reflection of backscatter of emitted light by a body part in the three-dimensional input space. In various examples, movement of the body part may be determined using the self-mixing interferometry signal, which may in turn be used to determine an input. In some examples, a body part displacement or a body part speed and an absolute distance to the body part may be determined using the self-mixing interferometry signal and used to determine an input. In a number of examples, multiple self-mixing interferometry sensors may be used and the movement may be determined by analyzing differences between the respective produced self-mixing interferometry signals.

In various embodiments, an input device includes an enclosure defining a three-dimensional input space; a self-mixing interferometry sensor coupled to the enclosure and configured to emit a beam of coherent light from an optical resonant cavity to illuminate a body part in the three-dimensional input space, receive a reflection or backscatter of the beam into the optical resonant cavity, and produce a self-mixing interferometry signal resulting from self-mixing of the coherent light within the optical resonant cavity; and a processor. The processor is configured to determine a body part displacement or a body part speed and an absolute distance to the body part using the self-mixing interferometry signal, and determine an input using the body part displacement or the body part speed and the absolute distance.

In some examples, the input corresponds to a touch of the body part to an object. In various implementations of such examples, the processor estimates an amount of force exerted on the object by the body part.

In a number of examples, the self-mixing interferometry sensor is configured to emit the beam at an oblique angle with respect to a wall of the enclosure. In some examples, the self-mixing interferometry sensor is configured to emit the beam normal with respect to a wall of the enclosure. In a number of examples, the enclosure is configured to be mounted on the body part. In various examples, the enclosure is configured to provide a gap between the self-mixing interferometry sensor and the body part.

In some embodiments, an input device includes an enclosure defining a three-dimensional input space; a first self-mixing interferometry sensor coupled to the enclosure and configured to emit a first coherent light beam from a first optical resonant cavity to illuminate a body part in the three-dimensional input space, receive a first reflection or backscatter of the first coherent light beam into the first optical resonant cavity, and produce a first self-mixing interferometry signal; a second self-mixing interferometry sensor coupled to the enclosure and configured to emit a second coherent light beam from a second optical resonant cavity to illuminate the body part in the three-dimensional input space, receive a second reflection or backscatter of the second coherent light beam into the second optical resonant cavity, and produce a second self-mixing interferometry signal; and a processor. The processor is configured to determine movement of the body part by analyzing differences between the first self-mixing interferometry signal and the second self-mixing interferometry signal and determine an input using the movement.

In various examples, the first self-mixing interferometry sensor and the second self-mixing interferometry sensor are positioned on opposing sides of the three-dimensional input space. In some implementations of such examples, the movement is lateral movement of the body part between the first self-mixing interferometry sensor and the second self-mixing interferometry sensor.

In a number of examples, the processor screens out a false input using differences between the first self-mixing interferometry signal and the second self-mixing interferometry signal. In various examples, the movement of the body part is deformation of a fingernail. In a number of examples, the first self-mixing interferometry sensor includes an optical component configured to tilt the first beam. In some examples, the movement corresponds to withdrawal of the body part from the enclosure.

In a number of embodiments, an input system includes an enclosure defining a three-dimensional input space; a self-mixing interferometry sensor coupled to the enclosure and configured to emit a beam of coherent light from an optical resonant cavity to illuminate a body part in the three-dimensional input space, receive a reflection or backscatter of the beam into the optical resonant cavity, and produce a self-mixing interferometry signal resulting from self-mixing of the coherent light within the optical resonant cavity; and a processor. The processor is configured to determine movement of the body part using the self-mixing interferometry signal and determine an input using the movement.

In some examples, the self-mixing interferometry sensor is a component of a first electronic device and the processor is a component of a second electronic device that communicates with the first electronic device. In various examples, the processor is a component of a first electronic device and transmits the input to a second electronic device.

In a number of examples, the input is selection of a virtual key of a virtual keyboard. In various examples, the movement is at least one of an expansion of the body part or a contraction of the body part. In some examples, the input corresponds to movement of the body part along a surface.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
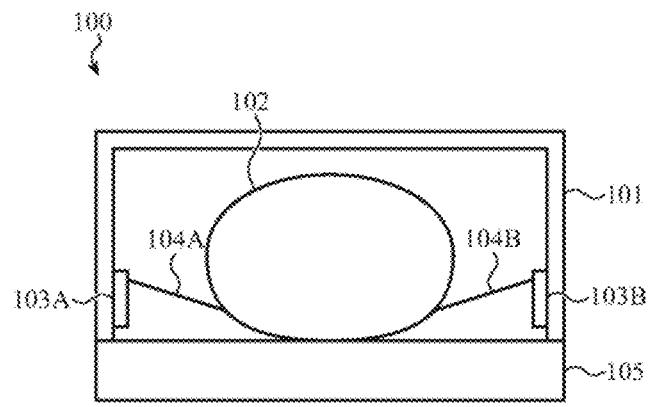
FIG. 1A depicts a first example of an input device that uses self-mixing interferometry to determine movement within an enclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

An electronic device may use one or more sensors to detect movement of a body part (such as a finger, hand, and so on) and/or other object in order to determine input using that input. For example, the movement may correspond to one or more gestures, presses on a surface, force applied to a surface, sliding along a surface, and so on. Sensors used to detect such movement may include strain gauges, piezoelectric sensors, capacitive sensors, magnetic hall sensors, intensity-based optical sensors, and so on. However, many of these sensors may involve component configurations that are limiting for some applications.

For example, the above sensors may be challenging to use in implementations where input corresponds to movement of a finger, hand, and/or other body part that does not involve the body part contacting an input surface such as a physical key, a touch screen, and so on. By way of illustration, such an implementation may involve movement of a body part to interact with a virtual keyboard that is presented on a heads up display but is not physically present. Use of the above sensors in such an implementation may involve gloves or other cumbersome apparatuses that may prevent and/or impair a user's tactile interaction with the user's environment.

Further, strain gauges and/or piezoelectric sensors may not be able to operate without contact with the body part. In some cases, strain gauge and/or piezoelectric sensor implementations may involve tight contact with the body part. Capacitive sensors may not provide a linear response with varying sensor/target distance, may involve calibration, and may be subject to electromagnetic interference such that extensive shielding may be used. Magnetic hall sensors may be vulnerable to external magnetic fields. Intensity-based optical sensors may be influenced by background light and/or reflective properties of the body part (such as skin tone). Further, intensity-based optical sensors may use separate transmission and receiving paths and may not be able to provide a linear response and stable signal to noise ratio with varying distance.

Input devices that use one or more self-mixing interferometry sensors coupled to an enclosure to detect the movement of a body part within a three-dimensional input space defined by the enclosure may overcome the limitations of the above sensor implementations. In self-mixing interferometry, one or more beams of coherent or partially coherent light emitted by one or more stimulated emission sources (such as one or more vertical-cavity surface-emitting lasers or VCSELs, other lasers, and/or other coherent or partially coherent light sources) may be reflected or backscattered from an object and recoupled into the resonant cavity of the light source that emitted the coherent or partially coherent light. This recoupling may modify one or more interferometric parameters, such as a measurable phase-sensitive change in the resonant cavity electric field, carrier distribution, and/or other changes in the optical gain profile, lasing threshold, and so on of a laser to create a measurable change in the voltage on the laser junction (if the laser is being driven with a current source), a bias current on the laser (if the laser is being driven with a voltage source), and/or the optical power emitted by the laser.

The self-mixing interferometry signal may be analyzed in various ways to determine movement of the body part within the three-dimensional input space. For example, direct current laser bias and spectral analysis of the self-mixing interferometry signal that contains the Doppler shift of the reflected or backscattered light may be used to determine a body part speed without information on the direction of motion. By way of another example, triangular bias and spectral analysis of the subtracted self-mixing interferometry signal that contains the Doppler shift of the reflected or backscattered light may be used to determine the body part speed and absolute distance of the body part. By way of yet another example, sinusoidal bias current modulation and quadrature demodulation of the self-mixing interferometry signal that contains sine and cosine of the interferometric phase may be used to determine displacement. The input device may thus determine a variety of different inputs corresponding to different movement of the body part (such as movement within three-dimensional space, one or more gestures, presses to a surface, force applied to a surface, sliding along a surface, and so on) using the self-mixing interferometry signal.

Further, unlike strain gauges and/or piezoelectric sensors, the self-mixing interferometry sensor may be able to operate without tight or any contact with the body part. Unlike capacitive sensors, the self-mixing interferometry sensor may be capable of providing a linear response with varying sensor/target distance, may not require calibration, and may be immune to electromagnetic interference and thus not need extensive shielding. Unlike magnetic hall sensors, the self-mixing interferometry sensor may be immune to external magnetic fields. Unlike intensity-based optical sensors, the self-mixing interferometry sensor may not be influenced by background light, may not require separate transmission and receiving paths, may be independent of reflective properties of the body part, and may have a linear response and stable signal to noise ratio with varying distance.

As such, the input device may be configured with an enclosure and attached self-mixing interferometry sensor in more comfortable and convenient ways while allowing for detection of a wide variety of inputs. This may allow configurations where a user may directly touch objects within the user's environment, avoid constrictive apparatuses such as gloves, and so on while still enabling gathering of the data indicating the input.

The following disclosure relates to an input device including an enclosure defining a three-dimensional input space and one or more self-mixing interferometry sensors coupled to the enclosure and configured to produce a self-mixing interferometry signal resulting from reflection of backscatter of emitted light by a body part in the three-dimensional input space. In various examples, movement of the body part may be determined using the self-mixing interferometry signal, which may in turn be used to determine an input. In some examples, a body part displacement or a body part speed and an absolute distance to the body part may be determined using the self-mixing interferometry signal and used to determine an input. In a number of examples, multiple self-mixing interferometry sensors may be used and the movement may be determined by analyzing differences between the respective produced self-mixing interferometry signals.

These and other embodiments are discussed below with reference to FIGS. 1A-9. However, those skilled in the art will readily appreciate that the detailed description given herein with respect to these Figures is for explanatory purposes only and should not be construed as limiting.

FIG. 1A depicts a first example of an input device 100 that uses self-mixing interferometry to determine movement within an enclosure 101. The input device 100 may include the enclosure 101, which may define a three-dimensional input space within which a body part 102 may move (e.g., the area shown between the enclosure 101 and the object 105 within which the body part 102 is positioned). The input device 100 may also include one or more self-mixing interferometry sensor assemblies 103A, 103B that may be coupled to the enclosure 101 across one or more gaps from the body part 102. The self-mixing interferometry sensor assemblies 103A, 103B may each be configured to emit a beam of coherent light 104A, 104B to illuminate the body part 102 in the three-dimensional input space and produce a self-mixing interferometry signal resulting from self-mixing of the coherent light. The input device 100 may determine movement of the body part 102 using the self-mixing interferometry signal and determine an input using the movement.

In this example, the self-mixing interferometry sensor assemblies 103A, 103B are coupled to the enclosure 101 on opposite sides of the three-dimensional input space and the body part 102 from each other. This arrangement may enable the input device 100 to distinguish between movements of the body part 102 that change the position of both sides similarly from movements of the body part 102 that change positions differently, allow differential comparison of measurements from multiple sensors, and so on. However, it is understood that this is an example. In various examples, a different number of sensors (such as one, four, and so on) may be used in different configurations (such as sensors positioned adjacent each other, along an axis defined by the enclosure 101, and so on) without departing from the scope of the present disclosure. Various configurations are possible and contemplated.

Figure 1B:
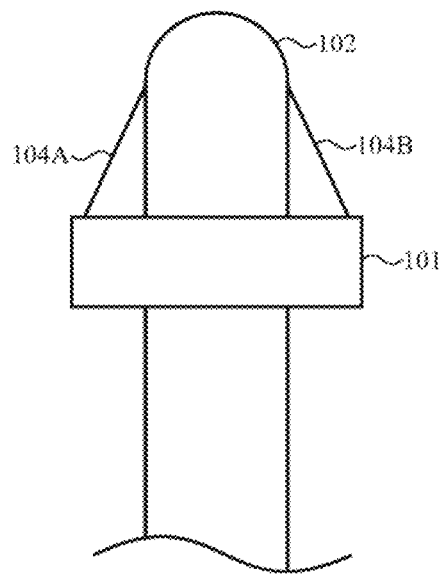
FIG. 1B depicts a top view of the input device of FIG. 1A.

FIG. 1B depicts a top view of the input device of FIG. 1A. FIG. 1B illustrates that the self-mixing interferometry sensor assemblies 103A, 103B shown in FIG. 1A may be configured so that the beams of coherent light 104A, 104B are emitted at a tilt with respect to the body part 102 rather than being configured to emit the beams of coherent light 104A, 104B directly at the body part 102 surface normal to the self-mixing interferometry sensor assemblies 103A, 103B. Tilted beams of coherent light 104A, 104B may enable more accurate determination of absolute distance (discussed below), but may involve a larger area between the self-mixing interferometry sensor assemblies 103A, 103B and the body part 102.

How the input device 100 may use the self-mixing interferometry sensor assemblies 103A, 103B to determine inputs will now be described with respect to FIGS. 1A and 1B. The input device 100 (and/or another device to which the input device 100 transmits data) may analyze the self-mixing interferometry signal in various ways to determine movement of the body part 102 within the three-dimensional input space. For example, direct current laser bias and spectral analysis of the self-mixing interferometry signal that contains the Doppler shift of the reflected or backscattered light (discussed in more detail below) may be used to determine a body part speed without information on the direction of motion. By way of another example, triangular bias and spectral analysis of the subtracted self-mixing interferometry signal that contains the Doppler shift of the reflected or backscattered light (discussed in more detail below) may be used to determine the body part velocity with information on the direction of motion and absolute distance of the body part. By way of yet another example, sinusoidal bias and quadrature demodulation of the self-mixing interferometry signal that contains sine and cosine of the interferometric phase (discussed in more detail below) may be used to determine displacement. The input device may thus determine a variety of different inputs corresponding to different movement of the body part 102 (such as movement within three-dimensional space, one or more gestures, presses to an object 105, force applied to the object 105, sliding along the object 105, and so on) using the self-mixing interferometry signal.

For example, the body part 102 may expand (or squish) upon contacting an object 105. The body part 102 may then contract when the contact ceases. Both expansion and contraction may cause the body part 102 to change proximity to the self-mixing interferometry sensor assemblies 103A, 103B. As such, touch of the body part 102 to an object 105 may be determined by determining a body part speed of the body part 102 moving toward and/or away from one or more of the self-mixing interferometry sensor assemblies 103A, 103B.

Movement towards both of the self-mixing interferometry sensor assemblies 103A, 103B may indicate expansion whereas movement away from both of the self-mixing interferometry sensor assemblies 103A, 103B may indicate contraction. Movement towards one of the self-mixing interferometry sensor assemblies 103A, 103B but away from the other could indicate lateral movement of the body part 102 between the self-mixing interferometry sensor assemblies 103A, 103B as opposed to expansion or contraction. If a signed body part velocity (velocity with information on the direction of motion) is determined using the self-mixing interferometry signal from one of the self-mixing interferometry sensor assemblies 103A, 103B, the input device 100 may be able to determine the direction of movement according to the sign, such as positive for movement towards and negative for movement away. However, if a body part speed without information on the direction of motion is determined from one of the self-mixing interferometry sensor assemblies 103A, 103B, the input device 100 may not be able to determine the direction of movement absent other data, such as absolute distance where a decrease in absolute distance indicates movement towards and an increase in absolute distance indicates movement away. In some examples, the direction of the movement may be determined by comparing the differences between the body part velocities determined using the self-mixing interferometry signals from each the self-mixing interferometry sensor assemblies 103A, 103B. In various examples, determination of a first body part speed followed by a corresponding second body part speed could indicate that expansion followed by contraction has occurred without having to determine the sign of the speed as the two movements would likely be proportional (contraction typically following an expansion of the same magnitude in a short period of time whereas expansion less typically follows a contraction of the same magnitude in a short period of time) and the movement could thus be determined by looking at speed changes over a period of time.

In other implementations, such as a DC bias implementation, a gyroscope and an accelerometer may be used to disambiguate expansion from contraction. The gyroscope may provide the orientation of the body part 102 and the accelerometer may provide the direction of acceleration. When speed is non-zero: expansion may be indicated by gyroscope data that the body part 102 faces downwards and accelerometer data indicating downward motion; contraction may be indicated by gyroscope data that the body part 102 faces downwards and accelerometer data indicating upward motion; expansion may be indicated by gyroscope data that the body part 102 faces upwards and accelerometer data indicating upward motion; contraction may be indicated by gyroscope data that the body part 102 faces upwards and accelerometer data indicating downward motion; and so on. This combined use of a gyroscope and an accelerometer may be expanded to any orientation of the body part 102 and/or the object 105.

Further, the input device 100 may use detection of expansion followed shortly by contraction to distinguish a "press" (e.g., a touch to the object 105) from a "tap" (e.g., a short touch of the body part 102 to the object 105 that is quickly withdrawn). Additionally, the body part 102 may expand in proportion to the amount of force applied by the body part 102 to the object 105. The amount of expansion may be obtained by integrating the measured speed or velocity in time. As such, the input device 100 may use the amount of expansion detected to estimate an amount of force applied within a range of force amounts. This may vary for different body parts 102 and the input device 100 may thus calibrate estimated force amounts according to different body parts 102. Moreover, the sides of the body part 102 may expand and/or contract differently when the body part 102 is twisted (e.g., sheared) and/or slid along the object 105. As such, these different expansions and/or contractions may be determined and correlated to such twisting of the body part 102 and/or sliding of the body part 102 along the object 105. In this way, the input device 100 may use the movements detectable using the self-mixing interferometry sensor assemblies 103A, 103B to determine a wide variety of inputs.

Additionally, different portions of the body part 102 may have different dimensions. As such, the input device 100 may be able to detect movement of the body part 102 and/or portions thereof in three-dimensional space (such as vertically with respect to the self-mixing interferometry sensor assemblies 103A, 103B, forward or backwards horizontally as illustrated in FIG. 1A with respect to the self-mixing interferometry sensor assemblies 103A, 103B, movement in various directions between the self-mixing interferometry sensor assemblies 103A, 103B, and so on) and correlate such movement to one or more gestures and/or other inputs.

Moreover, the input device 100 may use the self-mixing interferometry sensor assemblies 103A, 103B to determine when the body part 102 is being withdrawn from the three-dimensional input space. For example, a determination of the absolute distance between one or more of the self-mixing interferometry sensor assemblies 103A, 103B and the body part 102 that increases to the size of the three-dimensional input space may indicate that the body part 102 has been withdrawn from the input area entirely. Various configurations are possible and contemplated without departing from the scope of the present disclosure.

Additionally, the input device 100 may use the self-mixing interferometry sensor assemblies 103A, 103B to determine when the body part 102 is bending. For example, bending of the body part 102 may change the absolute distance between the body part 102 and one or more of the self-mixing interferometry sensor assemblies 103A, 103B in a way that does not agree with the time integration of the measured velocity. This may be used to detect bending. Various configurations are possible and contemplated without departing from the scope of the present disclosure.

In various implementations, the input device 100 may operate in a "low power" or "low frame rate" mode where the self-mixing interferometry sensor assemblies 103A, 103B may be operated in a low power mode when the body part 102 is not present. Upon detection of the body part 102, the input device 100 may switch the self-mixing interferometry sensor assemblies 103A, 103B to a "high power," "high frame rate", "high accuracy" mode. Various configurations are possible and contemplated without departing from the scope of the present disclosure.

Further, the input device 100 may use the self-mixing interferometry sensor assemblies 103A, 103B to determine movements of the body part 102 that correspond to a pulse and/or heart rate. This may enable the input device to determine such a pulse and/or heart rate based on the movements, distinguish such pulse and/or heart rate from other movements related to input, and so on.

As discussed above, the body part 102 may move in two or more ways that cause the same movement of a first part of the body part 102 (such as one illuminated by the beam of coherent light 104A) but different movement of a second part and/or other parts of the body part 102 (such as one illuminated by the beam of coherent light 104B). As such, differential measurement using the self-mixing interferometry sensor assemblies 103A, 103B may allow the input device 100 to screen out false positives (e.g., false inputs) by distinguishing between the two kinds of movement. For example, this may enable the input device 100 to differentiate between a touch to an object 105 and lateral movement of the body part 102 between the self-mixing interferometry sensor assemblies 103A, 103B. By way of another example, this may enable the input device 100 to differentiate between a press on an object 105 and shaking and/or bending of the body part 102. Various configurations are possible and contemplated without departing from the scope of the present disclosure.

In some examples, additional self-mixing interferometry sensor assemblies 103A, 103B may enable increased differentiation and thus increased ability of the input device 100 to distinguish different kinds of motion of the body part 102. This may allow the input device 100 to more accurately reject false positives of inputs for which the input device 100 is monitoring. Such additional self-mixing interferometry sensor assemblies 103A, 103B may be positioned at different areas of the enclosure 101 around the body part 102, different areas along the length of the body part 102, and so on.

For example, the body part 102 may be a finger and different self-mixing interferometry sensor assemblies 103A, 103B may be configured with respect to a fingernail of such a finger, a tip of the finger, a top of the finger, a central region of the finger, one or more knuckles of the finger, and so on. Various configurations are possible and contemplated with respect to the present disclosure.

In various examples, the self-mixing interferometry sensor assemblies 103A, 103B may each include one or more vertical-cavity surface-emitting lasers (VCSELs), other lasers, and/or other coherent or partially coherent light sources with incorporated and/or separate photodetectors and/or other light sensors. The VCSELs may emit a beam of coherent light 104A, 104B from an optical resonant cavity to illuminate the body part 102 in the three-dimensional input space, receive a reflection or backscatter of the beam of coherent light 104A, 104B into the optical resonant cavity, and produce the self-mixing interferometry signal resulting from self-mixing of the coherent light within the optical resonant cavity (and/or use an integrated and/or separate photodetector and/or other light sensor to do so). Examples of the self-mixing interferometry sensor assemblies 103A, 103B will be discussed in more detail below.

In a number of examples, the enclosure 101 may be coupled to the body part 102. For example, the enclosure 101 may be a component of an apparatus that is mounted on the body part 102. In other examples, the enclosure 101 may be separate from the body part 102 but configured such that the body part 102 may be inserted into and moved within the three-dimensional input space defined by the body part 102. Various configurations are possible and contemplated with respect to the present disclosure.

Although the enclosure 101 is described as defining a three-dimensional input space, the three-dimensional input space defined by the enclosure 101 may not be completely surrounded and/or enclosed by the enclosure 101 and/or other components. For example, as shown, the enclosure 101 may surround three sides of the three-dimensional input space. Various configurations are possible and contemplated with respect to the present disclosure.

Although the above illustrates and describes the input device 100 monitoring motion of the body part 102, it is understood that this is an example. In various implementations, the input device 100 may monitor motion of any kind of object (such as a stylus, a tire, and so on) without departing from the scope of the present disclosure. Various configurations are possible and contemplated.

Figure 1C:
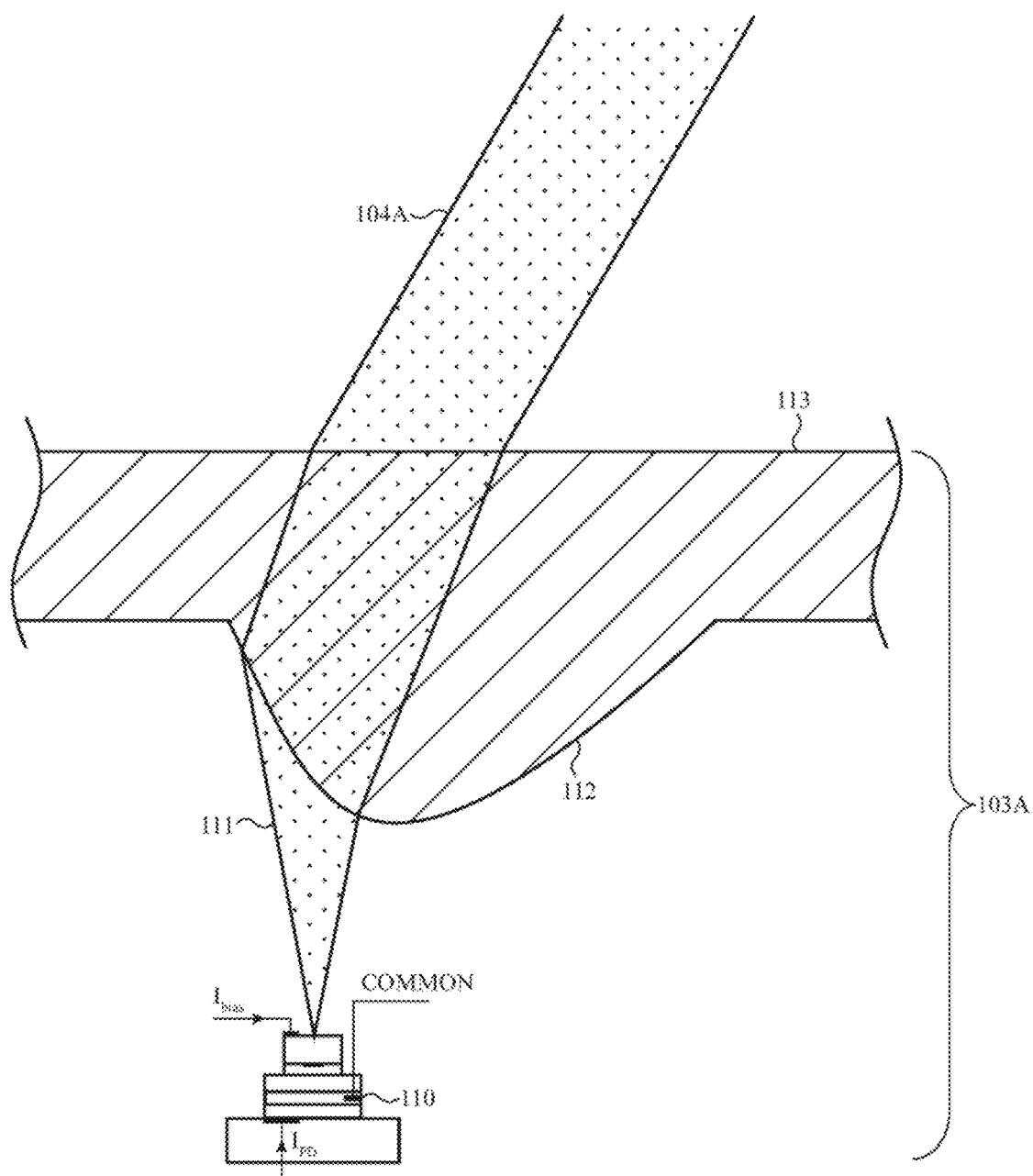
FIG. 1C depicts an example configuration of a self-mixing interferometry sensor assembly that may be used in the input device of FIG. 1A.

FIG. 1C depicts an example configuration of a self-mixing interferometry sensor assembly 103A that may be used in the input device 100 of FIG. 1A. The self-mixing interferometry sensor assembly 103A may include a VCSEL 110 and/or other laser, and/or other coherent or partially coherent light source with an incorporated and/or separate photodetector and/or other light sensor. The VCSEL 110 may emit coherent light 111 through a lens 112 of a lens substrate 113 and/or other optical element. The lens 112, lens substrate 113, and/or other optical element may collimate or focus the coherent light 111 into the beam of coherent light 104A. As shown, the lens 112, lens substrate 113, and/or other optical element may also function to tilt the beam of coherent light 104A with respect to the VCSEL 110.

Figure 1D:
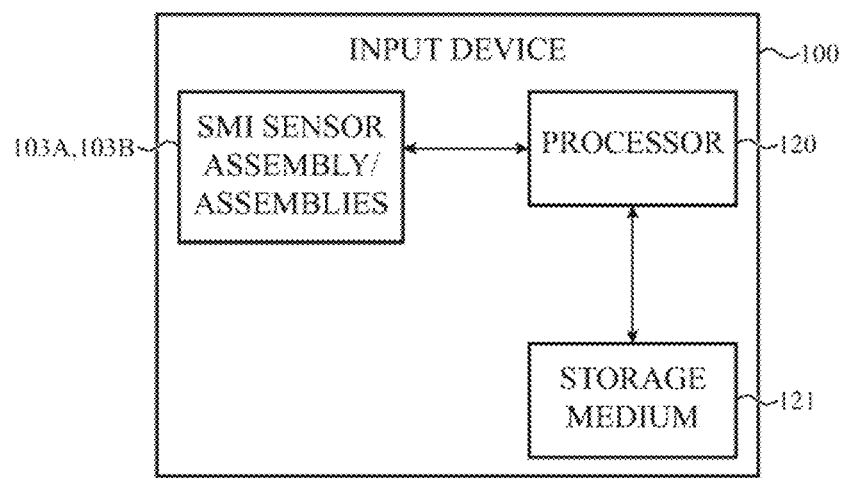
FIG. 1D depicts an example block diagram illustrating example functional relationships between example components that may be used in the input device of FIG. 1A.

FIG. 1D depicts an example block diagram illustrating example functional relationships between example components that may be used in the input device 100 of FIG. 1A. The input device 100 may include one or more processors 120 and/or other processing units and/or controllers; one or more self-mixing interferometry sensor assemblies 103A, 103B; one or more non-transitory storage media 121 (which may take the form of, but is not limited to, a magnetic storage medium; optical storage medium; magneto-optical storage medium; read only memory; random access memory; erasable programmable memory; flash memory; and so on); and/or other components (such as one or more communication units, output components, and so on). The processor 120 may execute instructions stored in the storage medium 121 to perform various input device functions, such as controlling the self-mixing interferometry sensor assemblies 103A, 103B; receiving one or more self-mixing interferometry signals from the self-mixing interferometry sensor assemblies 103A, 103B; determining movement of a body part or other object using one or more received self-mixing interferometry signals; determining one or more inputs based on one or more determined movements; communicating with one or more other electronic devices; and so on.

The input device 100 may be any kind of electronic device, such as a laptop computing device, a desktop computing device, a mobile computing device, a smart phone, a wearable device, an electronic watch, a kitchen appliance, a display, a printer, an automobile, a tablet computing device, and so on. Alternatively, the input device 100 may be a device that gathers data regarding movement of one or more objects and wired and/or wirelessly transmits such data to an electronic device (such as those detailed above). In some implementations of such examples, the input device may transmit one or more self-mixing interferometry signals, one or more movements determined from such self-mixing interferometry signals, one or more inputs determined from such movements, and so on. Various configurations are possible and contemplated without departing from the scope of the present disclosure.

By way of illustration, the input device 100 may be used to receive input for interacting with a virtual keyboard presented on a heads up display. As such, the input device 100 may detect movement and transmit data about the movement to the heads up display and/or a device that controls the heads up display to present the virtual keyboard.

Figure 2A:
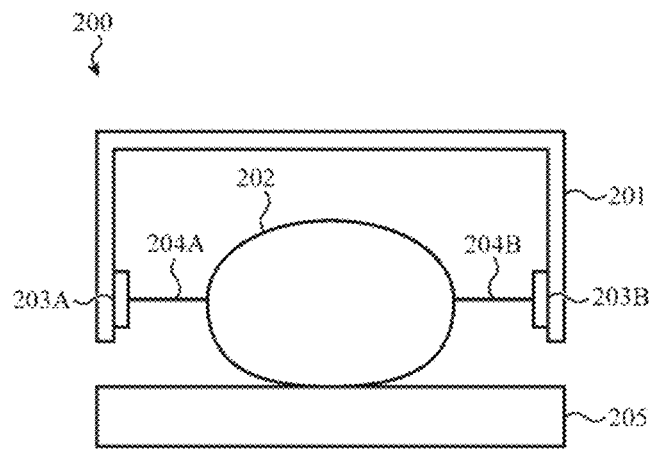
FIG. 2A depicts a second example of an input device that uses self-mixing interferometry to determine movement within an enclosure.
Figure 2B:
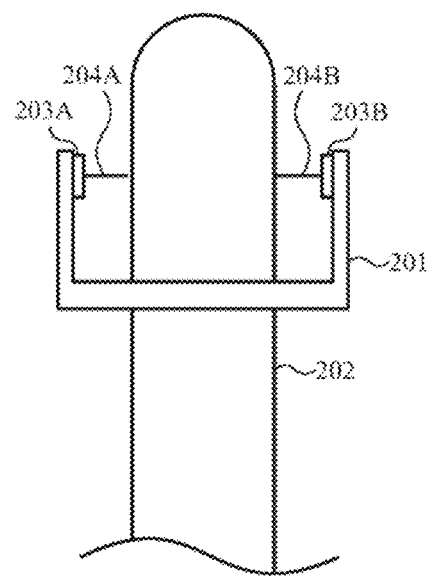
FIG. 2B depicts a top view of the input device of FIG. 2A.

FIG. 2A depicts a second example of an input device 200 that uses self-mixing interferometry to determine movement within an enclosure 201. FIG. 2B depicts a top view of the input device 200 of FIG. 2A. With respect to FIGS. 2A and 2B, the input device 200 may include the enclosure 201, which may define a three-dimensional input space within which a body part 202 may move. Like the input device 100 in FIGS. 1A-1B, the input device 200 may include one or more self-mixing interferometry sensor assemblies 203A, 203B that may each be configured to emit a beam of coherent light 204A, 204B to illuminate the body part 202 in the three-dimensional input space and produce a self-mixing interferometry signal resulting from self-mixing of the coherent light. Further similarly, the input device 200 may determine movement of the body part 202 using the self-mixing interferometry signal and determine an input using the movement.

By way of contrast with the input device 100 in FIGS. 1A-1B, the self-mixing interferometry sensor assemblies 203A, 203B may be configured to emit the beams of coherent light 204A, 204B directly at the body part 202 surface normal to the self-mixing interferometry sensor assemblies 203A, 203B rather than being emitted at a tilt with respect to the body part 202. This may involve less area between the self-mixing interferometry sensor assemblies 203A, 203B and the body part 202 than tilted beam implementations. Further, this may allow the self-mixing interferometry sensor assemblies 203A, 203B to omit beam tilting optics and/or other beam tilting components.

Figure 2C:
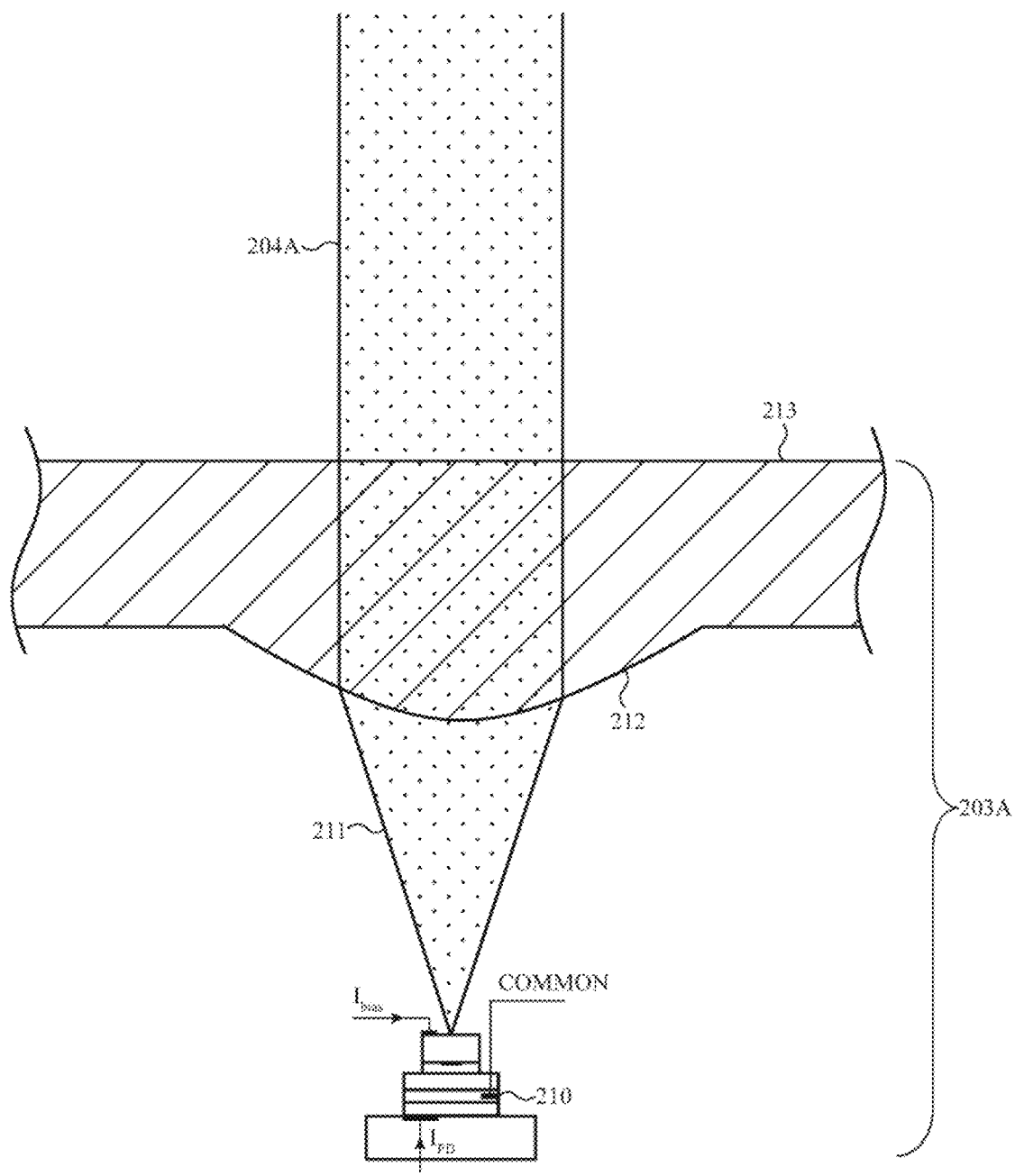
FIG. 2C depicts an example configuration of a self-mixing interferometry sensor assembly that may be used in the input device of FIG. 2A.

FIG. 2C depicts an example configuration of a self-mixing interferometry sensor assembly 203A that may be used in the input device of FIG. 2A. Similar to the self-mixing interferometry sensor assembly 103A of FIG. 1C, the self-mixing interferometry sensor assembly 203A may include a VCSEL 210 and/or other laser, and/or coherent or partially coherent light source with an incorporated and/or separate photodetector and/or other light sensor. The VCSEL 210 may emit coherent light 211 through a lens 212 of a lens substrate 213 and/or other optical element. The lens 212, lens substrate 213, and/or other optical element may collimate or focus the coherent light 211 into the beam of coherent light 204A. Unlike the self-mixing interferometry sensor assembly 103A of FIG. 1C, the lens 212, lens substrate 213, and/or other optical element may not be configured to tilt the beam of coherent light 204A with respect to the VCSEL 210.

Figure 3:
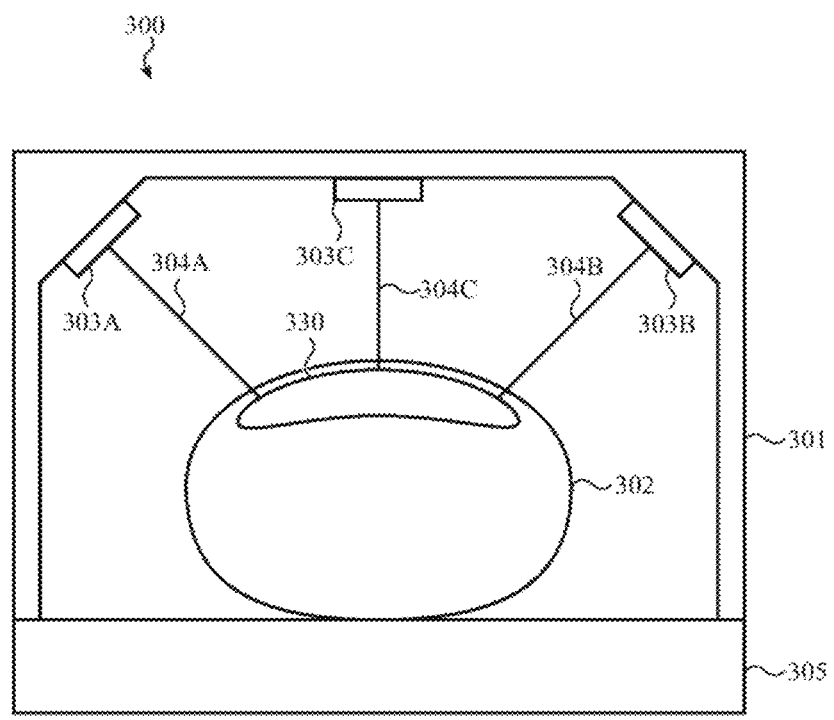
FIG. 3 depicts a third example of an input device that uses self-mixing interferometry to determine movement within an enclosure.

FIG. 3 depicts a third example of an input device 300 that uses self-mixing interferometry to determine movement within an enclosure 301. Similar to the input device 100 in FIGS. 1A-1B and/or the input device 200 in FIGS. 2A-2B, the input device 200 may include one or more self-mixing interferometry sensor assemblies 303A, 303B, 303C that may each be configured to emit a beam of coherent light 304A, 304B, 303C to illuminate a body part 302 in a three-dimensional input space and produce a self-mixing interferometry signal resulting from self-mixing of the coherent light. Further similarly, the input device 300 may determine movement of the body part 302 using the self-mixing interferometry signal and determine an input using the movement. By way of contrast, the input device 300 may include three rather than two self-mixing interferometry sensor assemblies 303A, 303B, 303C.

In this example, the body part 302 may be a finger and the self-mixing interferometry sensor assemblies 303A, 303B, 303C may be configured to emit the beam of coherent light 304A, 304B, 303C to illuminate a fingernail 330 of the finger. The fingernail 330 may deform in different ways depending on the movement of the finger, such as when the finger presses against an object 305, shears against the object 305, slides along the object 305, and so on. The input device 300 may use the self-mixing interferometry signals to determine the deformation and thus the movement of the finger and/or an associated input.

In some examples, fingernail polish and/or other substances on the fingernail 330 may affect deformation. In such examples, the input device 300 may detect the presence of such a substance and adjust determinations accordingly. The input device 300 may detect the presence of the substance by comparing the self-mixing interferometry signals to expected values, data from other sensors (such as measuring reflection using an optical sensor), and so on.

Figure 4A:
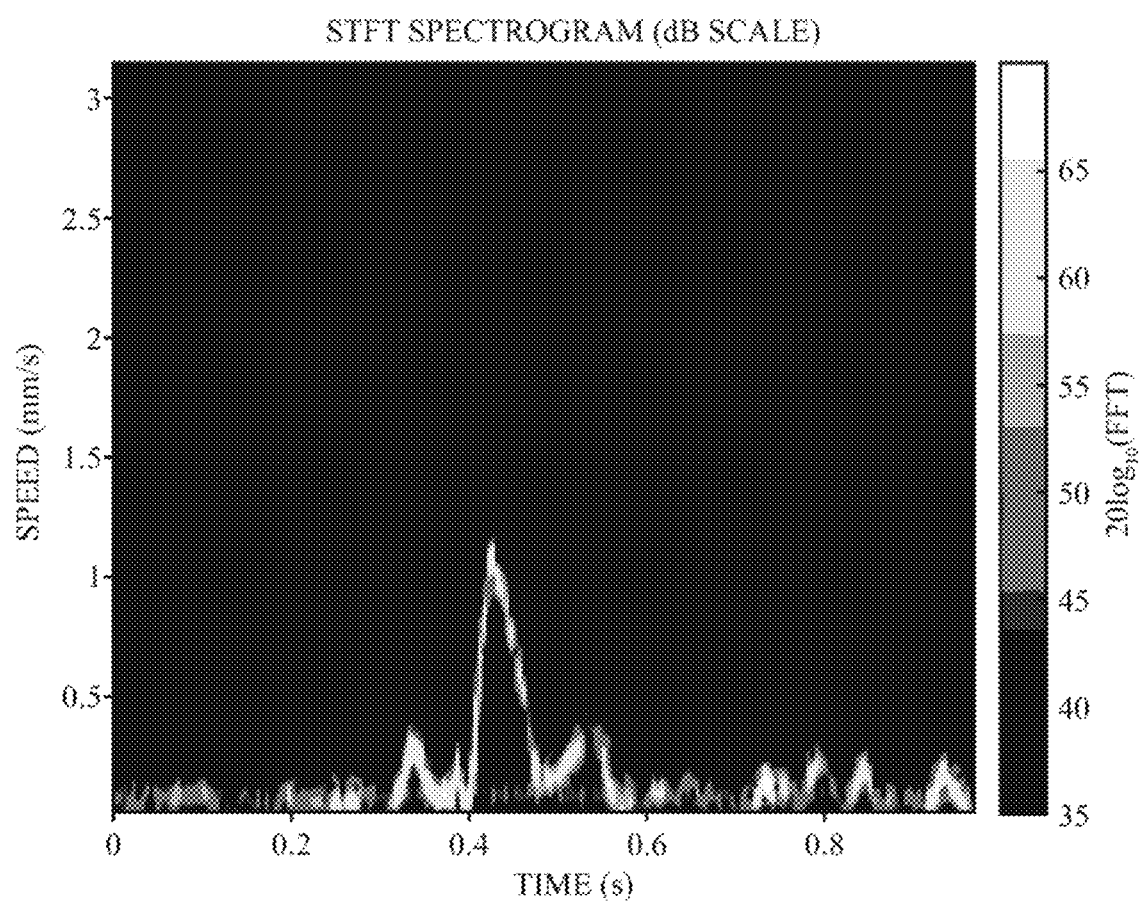
FIG. 4A depicts a speed profile of a press that may be measured by one or more of the input devices of FIG. 1A, 2A, or 3 using self-mixing interferometry.

FIG. 4A depicts a speed profile of a press that may be measured by one or more of the input devices 100, 200, 300 of FIG. 1A, 2A, or 3 using self-mixing interferometry. The speed profile correlates speed of movement over time. The speed profile illustrates a peak at a time 0.4 second that is significantly higher in speed than surrounding measurements. This peak may correlate to the press.

Figure 4B:
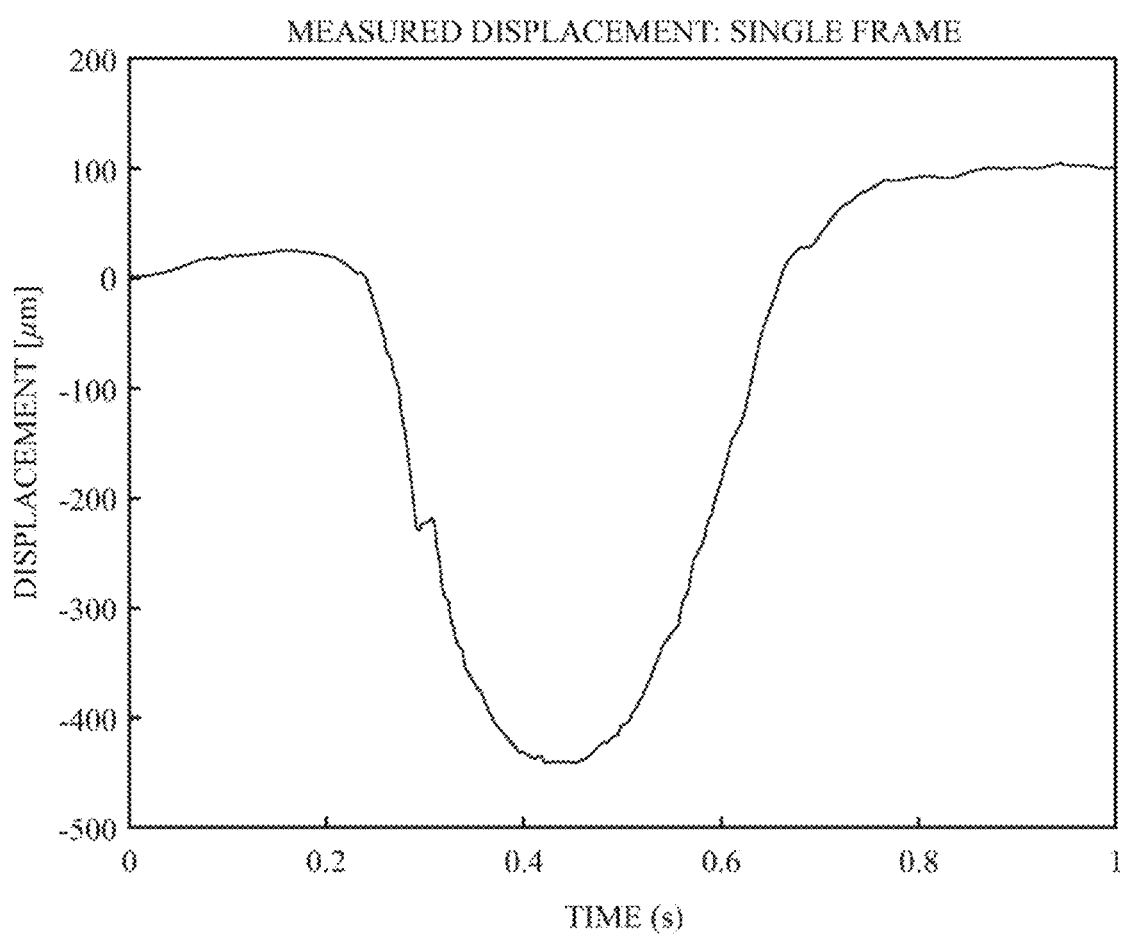
FIG. 4B depicts a displacement profile of a press that may be measured by one or more of the input devices of FIG. 1A, 2A, or 3 using self-mixing interferometry.

FIG. 4B depicts a displacement profile of a press that may be measured by one or more of the input devices 100, 200, 300 of FIG. 1A, 2A, or 3 using self-mixing interferometry. FIG. 4B may not correspond to the same event to which FIG. 4A corresponds. FIGS. 4A and 4B may be at different times. The displacement profile illustrates measured relative displacement over time. The displacement profile illustrates a trough at a time 0.4 second that is significantly lower than surrounding measurements. This trough may correlate to the press.

Figure 4C:
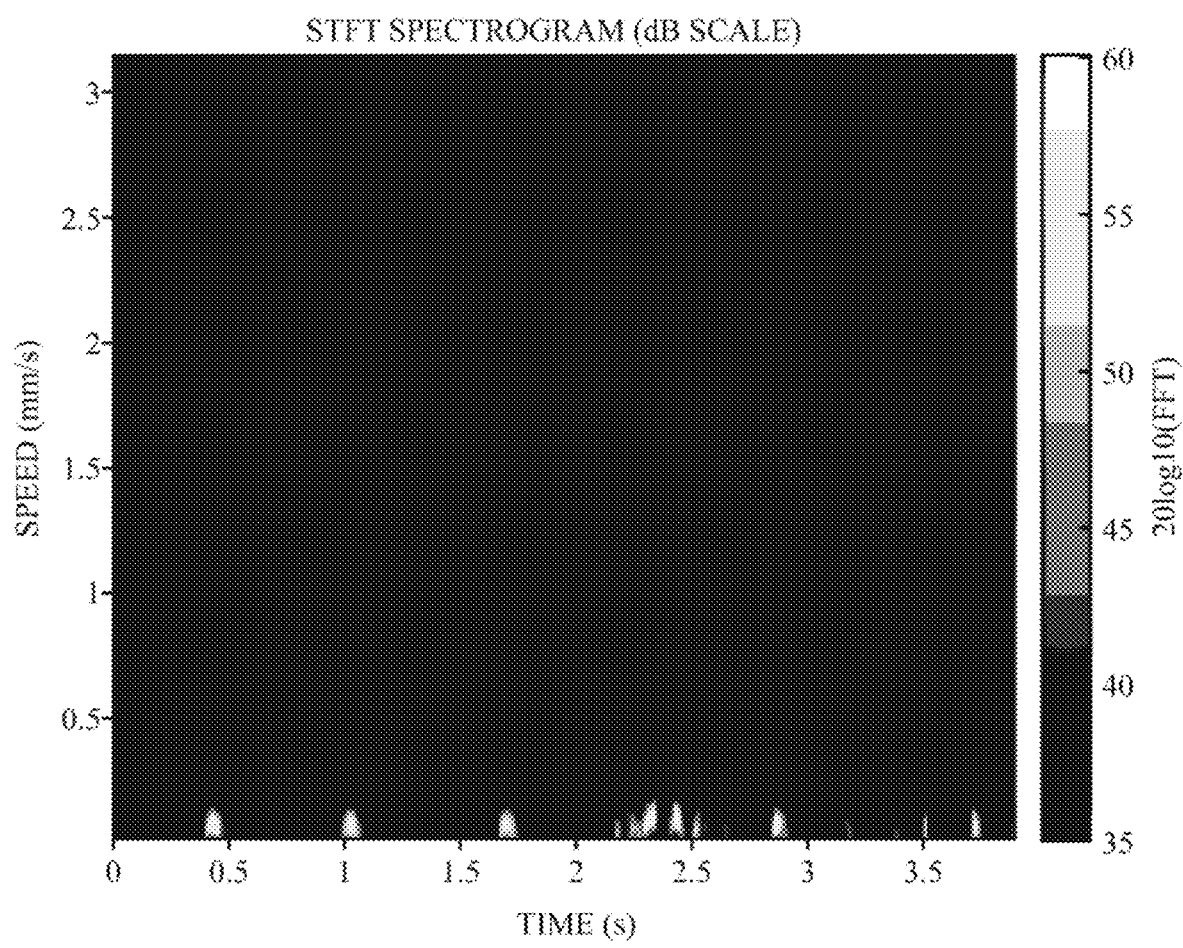
FIG. 4C depicts a heart rate that may be measured by one or more of the input devices of FIG. 1A, 2A, or 3 using self-mixing interferometry.

FIG. 4C depicts a heart rate that may be measured by one or more of the input devices 100, 200, 300 of FIG. 1A, 2A, or 3 using self-mixing interferometry. FIG. 4C correlates speed over time. As shown, a number of similar peaks are present at times 0.5, 1, and 1.75. Due to the regularity and similarity, these peaks may be determined to relate to movement corresponding to a heart rate. As also shown, there are a number of irregular and different peaks between 2.25 and 3.75. Due to the irregularity and differences, these peaks may be determined to relate to movement other than a heart rate.

Figure 5A:
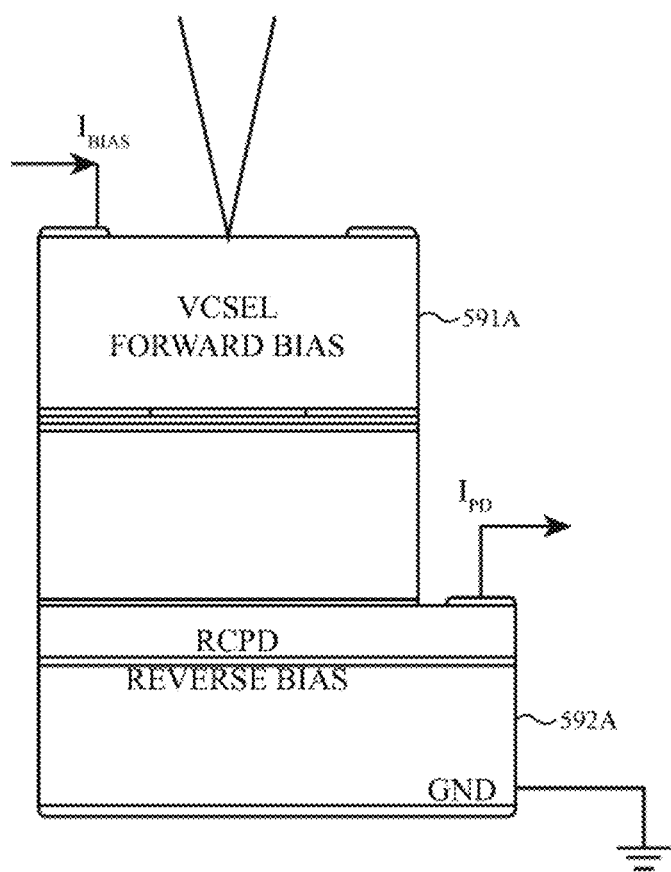
FIG. 5A depicts a first example self-mixing interferometry sensor that may be used in one or more of the input devices of FIG. 1A, 2A, or 3.

FIG. 5A depicts a first example self-mixing interferometry sensor that may be used in one or more of the input devices 100, 200, 300 of FIG. 1A, 2A, or 3. In this example, the self-mixing interferometry sensor may be a VCSEL 591A with an integrated resonant cavity (or intra-cavity) photodetector (RCPD) 592A.

Figure 5B:
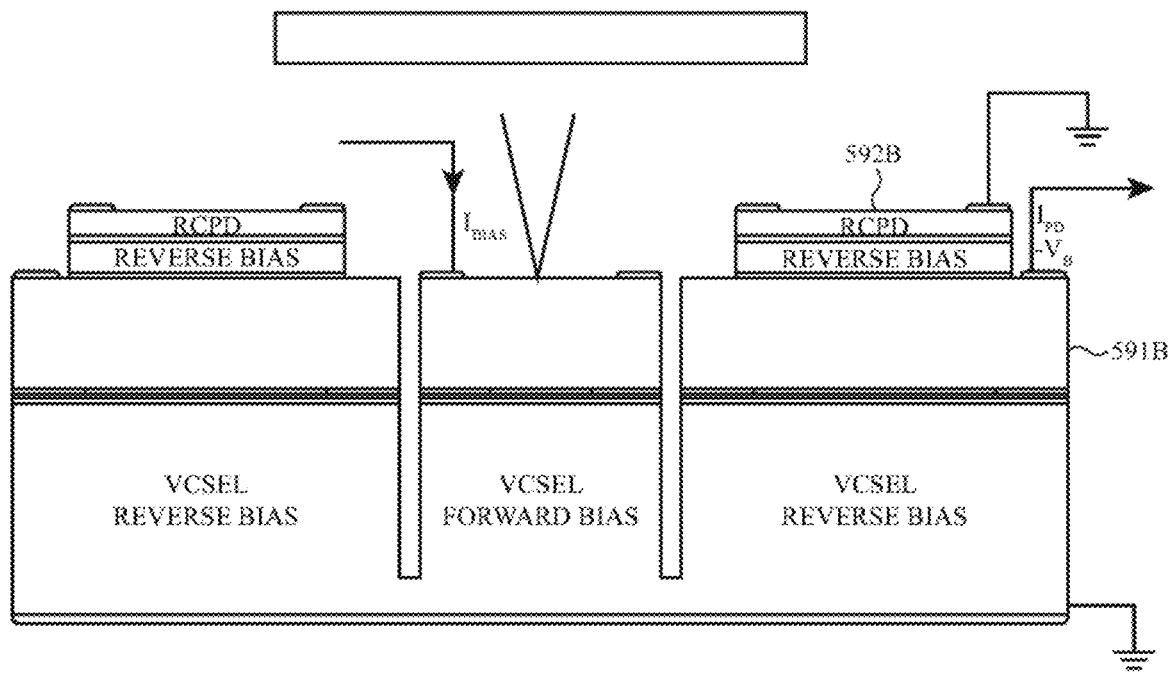
FIG. 5B depicts a second example self-mixing interferometry sensor that may be used in one or more of the input devices of FIG. 1A, 2A, or 3.

FIG. 5B depicts a second example self-mixing interferometry sensor that may be used in one or more of the input devices 100, 200, 300 of FIG. 1A, 2A, or 3. In this example, the self-mixing interferometry sensor may be a VCSEL 591B with an extrinsic on-chip photodetector. As shown, an RCPD 592B may form a disc around the VCSEL 591B.

Figure 5C:
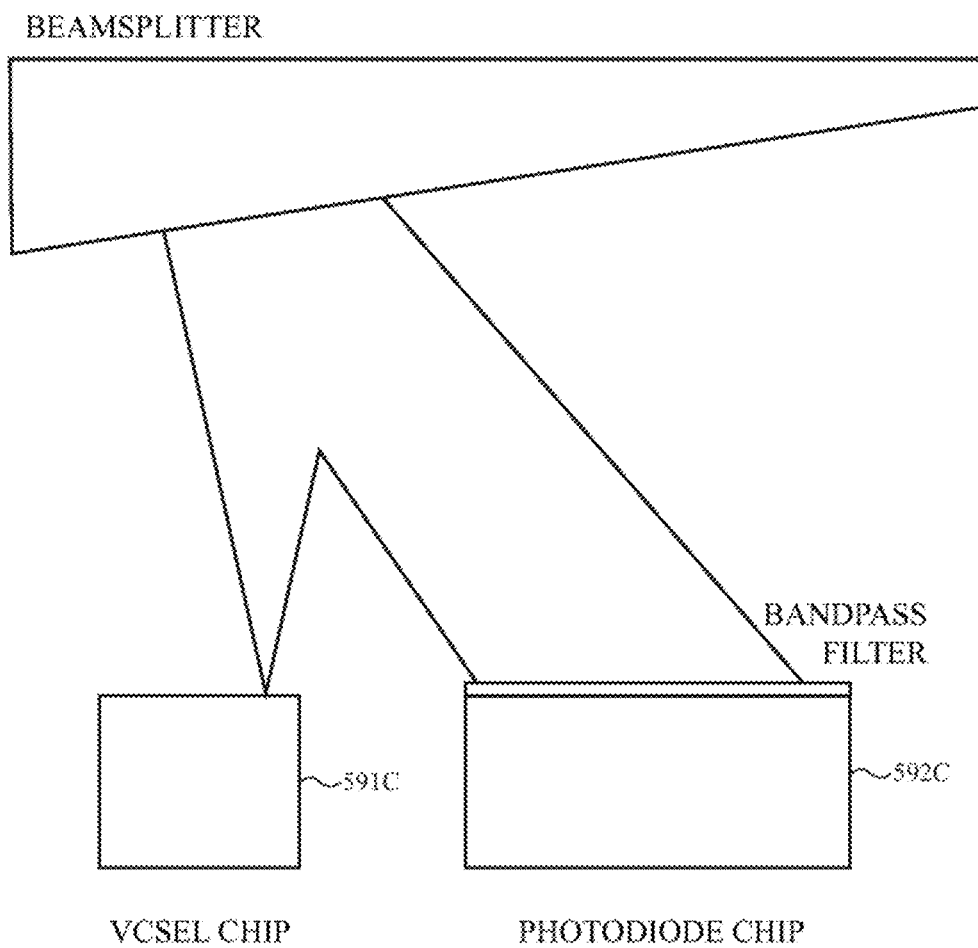
FIG. 5C depicts a third example self-mixing interferometry sensor that may be used in one or more of the input devices of FIG. 1A, 2A, or 3.

FIG. 5C depicts a third example self-mixing interferometry sensor that may be used in one or more of the input devices 100, 200, 300 of FIG. 1A, 2A, or 3. In this example, the self-mixing interferometry sensor may be a VCSEL 591C with an extrinsic off-chip photodetector 592C.

Figure 5D:
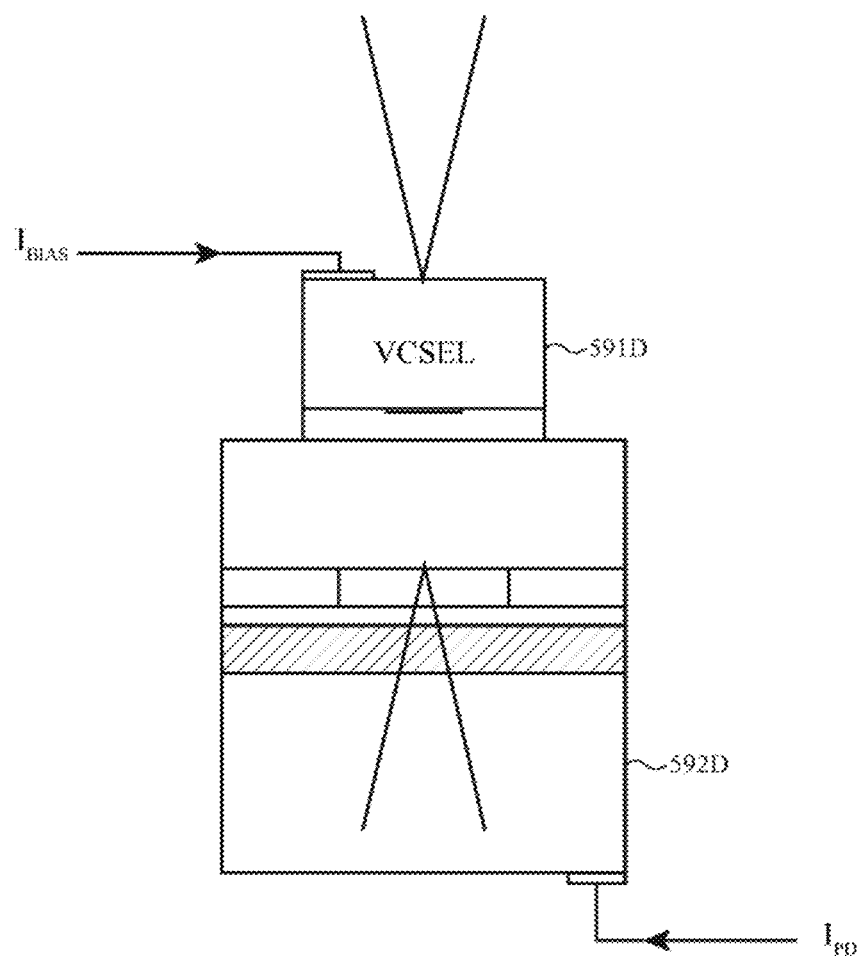
FIG. 5D depicts a fourth example self-mixing interferometry sensor that may be used in one or more of the input devices of FIG. 1A, 2A, or 3.

FIG. 5D depicts a fourth example self-mixing interferometry sensor that may be used in one or more of the input devices 100, 200, 300 of FIG. 1A, 2A, or 3. In this example, the self-mixing interferometry sensor may be a dual-emitting VCSEL 591D with an extrinsic off-chip photodetector 592D. For example, the top emission may be emitted towards optics and/or another target and the bottom emission may be provided to an extrinsic photodetector 592D.

Figure 6:
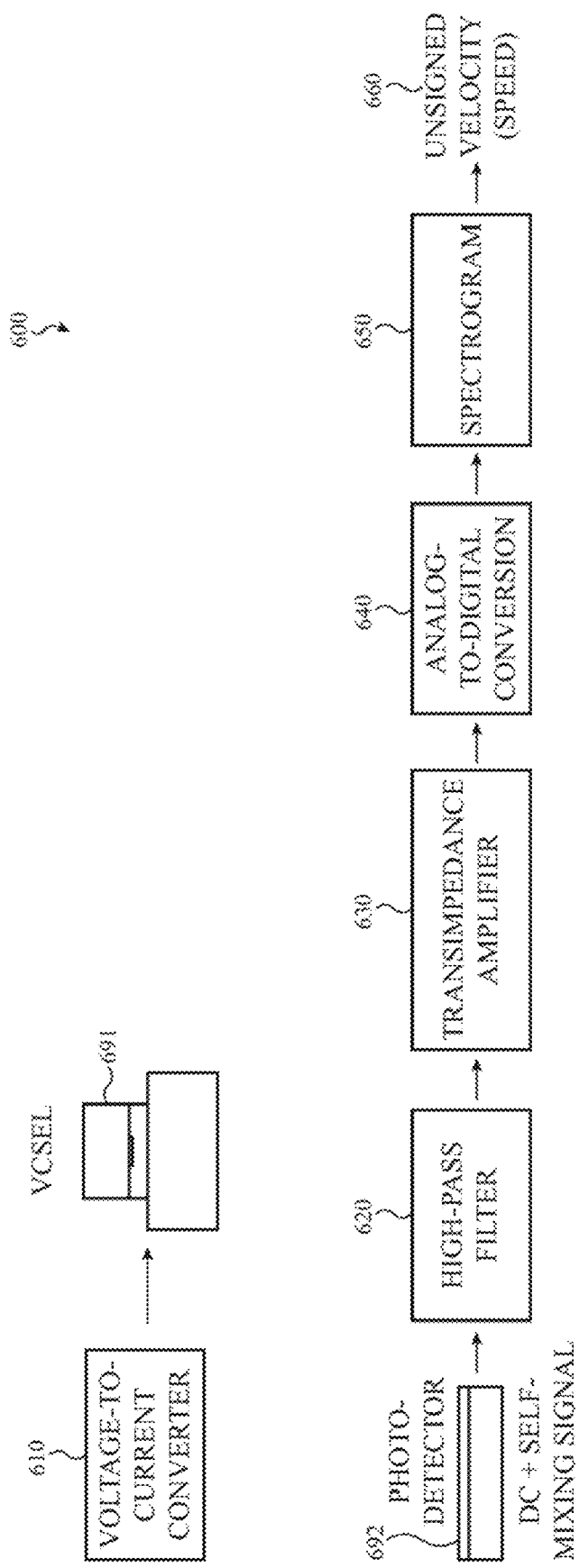
FIG. 6 depicts a direct current bias procedure for determining speed of an object using self-mixing interferometry. This procedure may be used by one or more of the input devices of FIG. 1A, 2A, or 3.

FIG. 6 depicts a direct current bias procedure 600 for determining speed of an object using self-mixing interferometry. This procedure 600 may be used by one or more of the input devices 100, 200, 300 of FIG. 1A, 2A, or 3.

The procedure includes generating an initial digital signal and processing it to produce a current 610 as an input to a VCSEL 691. For DC bias, a digital signal may not be necessary. As the current 610 may be constant, a fixed analog voltage may be applied to voltage-to-current converter. In alternative implementations, a digital signal may be used. As described above, movement of a target can cause changes in an interferometric parameter, such as a parameter of the VCSEL 691 or of a photodetector 692 operating in the system. The changes can be measured to produce a signal. In the embodiment shown it will be assumed the signal is measured by a photodetector 692. The signal may first be passed into a high-pass filter 620. As the signal from a photodetector (or a VCSEL in other embodiments) may typically be a current signal, a transimpedance amplifier 630 can produce a corresponding voltage output (with or without amplification) for further processing. The voltage output can then be sampled and quantized by an analog-to-digital conversion block 640. The output may be used to generate a spectrogram 650 by means of a spectral analysis procedure (e.g., a fast Fourier transform), from which an unsigned speed (or speed) 660 may be determined.

Figure 7:
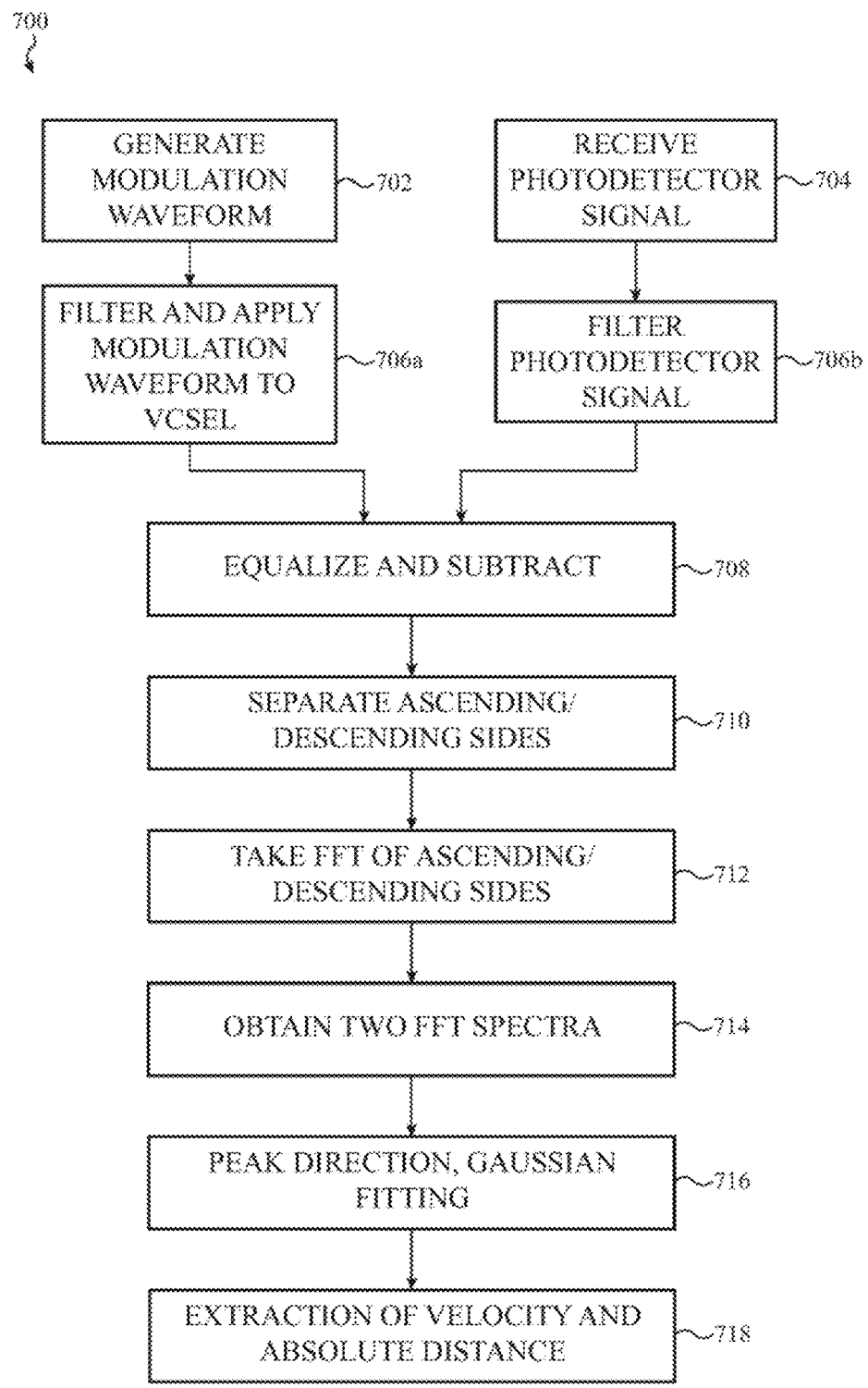
FIG. 7 depicts a first triangular bias procedure for determining velocity and absolute distance of an object using self-mixing interferometry. This procedure may be used by one or more of the input devices of FIG. 1A, 2A, or 3.
Figure 8:
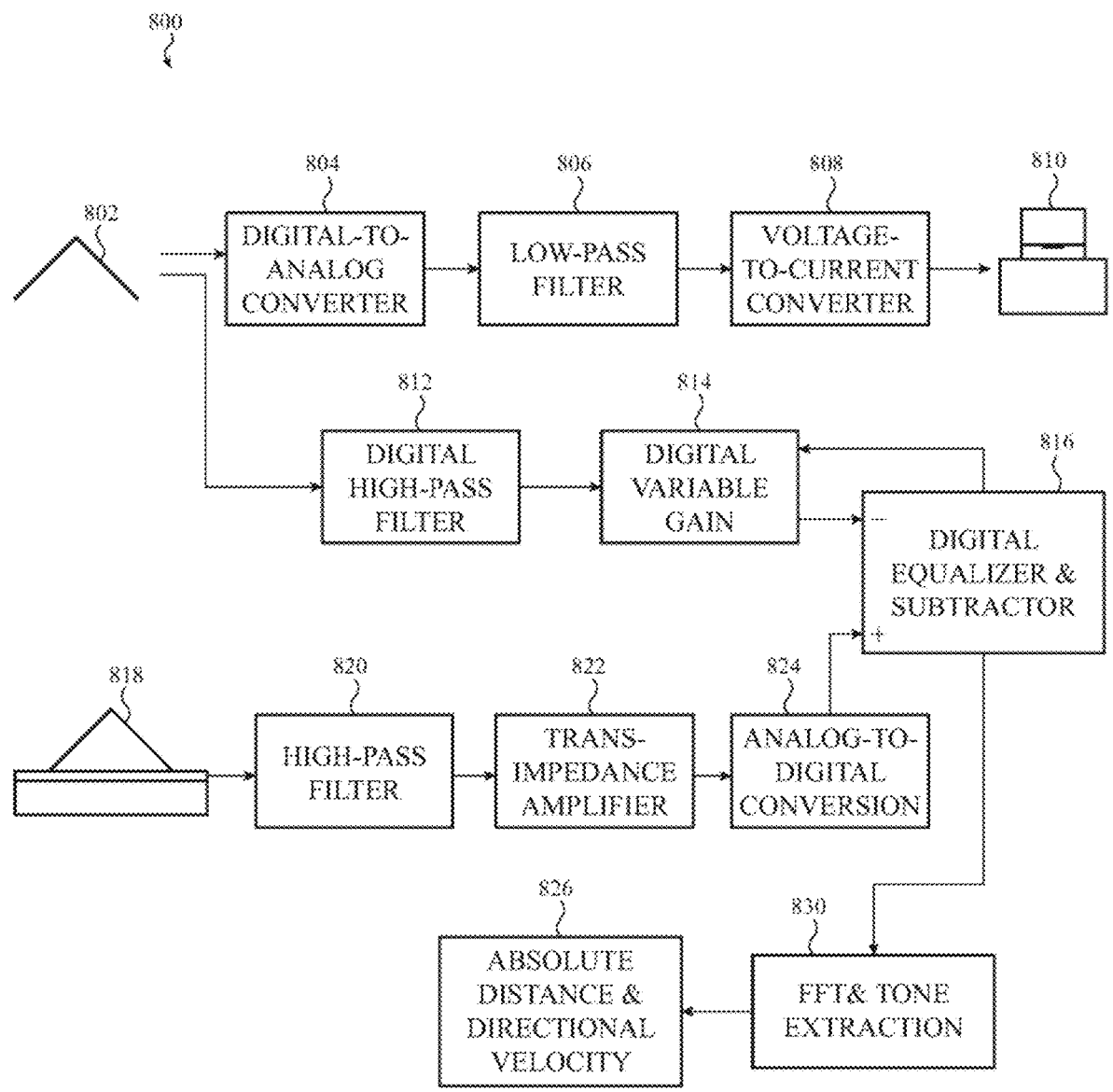
FIG. 8 depicts a second triangular bias procedure for determining velocity and absolute distance of an object using self-mixing interferometry. This procedure may be used by one or more of the input devices of FIG. 1A, 2A, or 3.

FIGS. 7 and 8 respectively show a flow chart of a method and a block diagram of a system to implement a spectrum analysis procedure that can be used as part of determining and/or estimating an absolute distance. The method and the system may drive or modulate a laser, such as one or more VCSELs, with a modulation current 802. The method and the system may also analyze a signal 818 related to an interferometric parameter. For purposes of explanation, in the embodiments of FIGS. 7 and 8 it will be assumed that the modulation current 802 has a triangle waveform. One of skill in the art will recognize how the method and the system can be implemented using alternative modulation current waveforms. The spectrum analysis method concurrently analyzes the modulation current 802 and the signal 818 of the interferometric parameter. The modulation current 802 and the signal 818 of the interferometric parameter are received at respective receiving circuits. Such receiving circuits may be one or more of the blocks of the system shown in FIG. 8 and described below, or may be one or more dedicated processing units such as a graphics processing unit, an ASIC, or an FPGA, or may be a programmed microcomputer, microcontroller, or microprocessor. Various stages of the method may be performed by separate such processing units, or all stages by one (set of) processing unit(s).

FIG. 7 depicts a first triangular bias procedure 700 for determining velocity and absolute distance of an object using self-mixing interferometry. This procedure 700 may be used by one or more of the input devices 100, 200, 300 of FIG. 1A, 2A, or 3.

At the initial stage 702, an initial signal is generated, such as by a digital or an analog signal generator. At stage 706a the generated initial signal is processed as needed to produce the triangle waveform modulation current 802 that is applied to the VCSEL. Stage 706a can be, as needed, operations of digital-to-analog conversion (DAC) (such as when the initial signal is an output of a digital step generator), low-pass filtering (such as to remove quantization noise from the DAC), and voltage-to-current conversion.

The application of the modulation current 802 to the VCSEL induces a signal 818 in the interferometric property. It will be assumed for simplicity of discussion that the signal 818 of the interferometric property is from a photodetector, but in other embodiments it may be another signal of an interferometric property from another component. At initial stage 704, the signal 818 is received. At stage 706b, initial processing of the signal 818 is performed as needed. Stage 706b may be high-pass filtering or a digital subtraction.

At stage 708 the processing unit may equalize the received signals in order to match their peak-to-peak values, mean values, root-mean-square values, or any other characteristic values, if necessary. For example the signal 818 may be a predominant triangle waveform component being matched to the modulation current 802, with a smaller and higher frequency component due to changes in the interferometric property. High-pass filtering may be applied to the signal 818 to obtain the component signal related to the interferometric property. Also this stage may involve separating and/or subtracting the parts of the signal 818 and the modulation current 802 corresponding to the ascending and to the descending time intervals of the modulation current 802. This stage may include sampling the separated information.

At stages 710 and 712, a separate FFT is first performed on the parts of the processed signal 818 corresponding to the ascending and to the descending time intervals. Then the two FFT spectra are analyzed at stage 714.

At stage 716, further processing of the FFT spectra can be applied, such as to remove artifacts and reduce noise. Such further processing can include peak detection and Gaussian fitting around the detected peak for increased frequency precision. From the processed FFT spectra data, information regarding the absolute distance can be obtained at stage 718.

FIG. 8 depicts a second triangular bias procedure 800 for determining velocity and absolute distance of an object using self-mixing interferometry. This procedure 800 may be used by one or more of the input devices 100, 200, 300 of FIG. 1A, 2A, or 3.

FIG. 8 shows a block diagram of a system that may implement the spectrum analysis described in the method described above with respect to FIG. 7. In the exemplary system shown, the system includes generating an initial digital signal and processing it as needed to produce a modulation current 802 as an input to the VCSEL 810. In an illustrative example, an initial step signal may be produced by a digital generator to approximate a triangle function. The digital output values of the digital generator are used in the digital-to-analog (DAC) converter 804. The resulting voltage signal may then be filtered by the low-pass filter 806 to remove quantization noise. Alternatively, an analog signal generator based on an integrator can be used to generate an equivalent voltage signal directly. The filtered voltage signal then is an input to a voltage-to-current converter 808 to produce the desired modulation current 802 in a form for input to the VCSEL 810.

As described above, movement of a target can cause changes in an interferometric parameter, such as a parameter of the VCSEL 810 or of a photodetector operating in the system. The changes can be measured to produce a signal 818. In the embodiment shown it will be assumed the signal 818 is measured by a photodetector. For the modulation current 802 having the triangle waveform, the signal 818 may be a triangle wave of a similar period combined with a smaller and higher frequency signal related to the interferometric property. The signal 818 may not be perfectly linear even though the modulation current 802 may be. This may be because bias-current versus light-output of the curve of the VCSEL 810 may be non-linear due to non-idealities, such as self-heating effects.

The signal 818 is first passed into the high-pass filter 820, which can effectively convert the major ascending and descending ramp components of the signal 818 to DC offsets. As the signal 818 from a photodetector (or a VCSEL in other embodiments) may typically be a current signal, the transimpedance amplifier 822 can produce a corresponding voltage output (with or without amplification) for further processing.

The voltage output can then be sampled and quantized by the analog-to-digital conversion (ADC) block 824. Before immediately applying a digital FFT to the output of the ADC block 824, it can be helpful to apply equalization. The initial digital signal values from the digital generator used to produce the modulation current 802 are used as input to the digital high-pass filter 812 to produce a digital signal to correlate with the output of the ADC block 824. An adjustable gain can be applied by the digital variable gain block 814 to the output of the digital high-pass filter 812.

The output of the digital variable gain block 814 is used as one input to the digital equalizer and subtractor block 816. The other input to the digital equalizer and subtractor block 816 is the output of the ADC block 824. The two signals are differenced, and used as part of a feedback to adjust the gain provided by the digital variable gain block 814.

Equalization and subtraction may be used to clean up any remaining artifacts from the triangle that may be present in the signal 818. For example, if there is a slope error or nonlinearity in the signal 818, the digital high-pass filter 812 may not fully eliminate the triangle and artifacts may remain. In such a situation, these artifacts may show up as low frequency components after the FFT and make the peak detection difficult for nearby objects. Applying equalization and subtraction may partially or fully remove these artifacts.

Once an optimal correlation is obtained by the feedback, an FFT, indicated by block 830, can then be applied to the components of the output of the ADC block 824 corresponding to the rising and descending side of the triangle wave. From the FFT spectra obtained, absolute distance and/or directional velocity may be inferred using the detected peak frequencies on the rising and descending sides, as discussed above and indicated by block 826.

The method just described, and its variations, involve applying a spectrum analysis to an interferometric parameter. However, it is understood that this is an example. In other implementations, alternate methods for determining absolute distances may be obtained directly from the time domain signal of an interferometric parameter, without applying a spectrum analysis. Various configurations are possible and contemplated without departing from the scope of the present disclosure.

Figure 9:
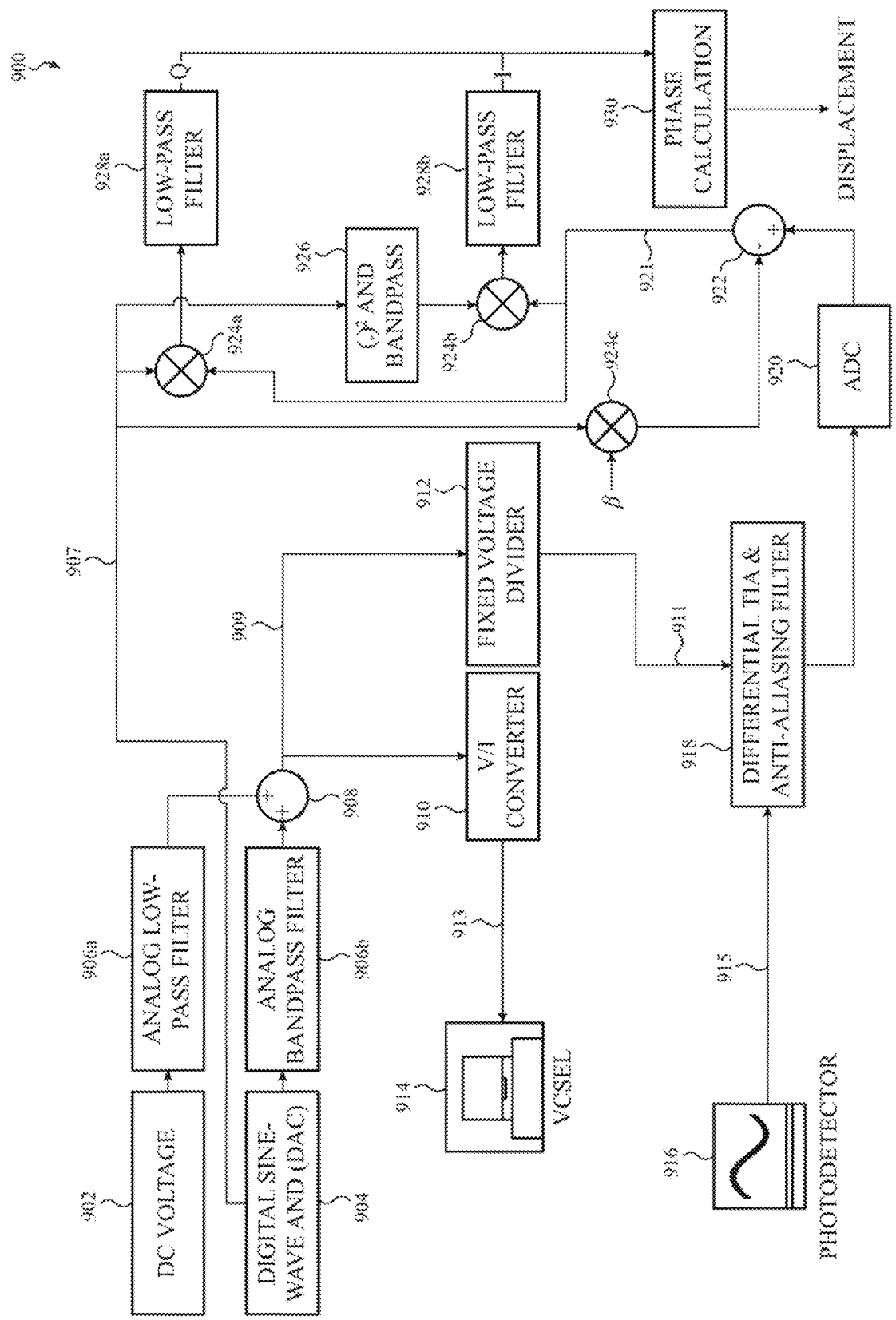
FIG. 9 depicts a sinusoidal bias procedure for determining displacement of an object using quadrature modulation with self-mixing interferometry. This procedure may be used by one or more of the input devices of FIG. 1A, 2A, or 3.

FIG. 9 depicts a sinusoidal bias procedure 900 for determining displacement of an object using quadrature modulation with self-mixing interferometry. This procedure 900 may be used by one or more of the input devices 100, 200, 300 of FIG. 1A, 2A, or 3.

As explained in more detail below, FIG. 9 shows components which generate and apply a sinusoidally modulated bias current to a VCSEL. The sinusoidal bias current can generate in a photodetector 916 an output current depending on the frequency of the sinusoidal bias and the displacement to the target. In the circuit of FIG. 9, the photodetector's 916 output current is digitally sampled and then multiplied with a first sinusoid at the frequency of the original sinusoidal modulation of the bias current, and a second sinusoid at double that original frequency. The two separate multiplied outputs are then each low-pass filtered and the phase of the interferometric parameter is calculated. Thereafter the displacement is determined using at least the phase.

The DC voltage generator 902 is used to generate a constant bias voltage. A sine wave generator 904 may produce an approximately single frequency sinusoid signal, to be combined with constant voltage. As shown in FIG. 9, the sine wave generator 904 is a digital generator, though in other implementations it may produce an analog sine wave. The low-pass filter 906a provides filtering of the output of the DC voltage generator 902 to reduce undesired varying of the constant bias voltage. The bandpass filter 906b can be used to reduce distortion and noise in the output of the sine wave generator 904 to reduce noise, quantization or other distortions, or frequency components of its signal away from its intended modulation frequency, $\omega_m$.

The circuit adder 908 combines the low-pass filtered constant bias voltage and the bandpass filtered sine wave to produce on link 909 a combined voltage signal which, in the embodiment of FIG. 9, has the form $V_0 + V_m \sin(\omega_m t)$. This voltage signal is used as an input to the voltage-to-current converter 910 to produce a current to drive the lasing action of the VCSEL diode 914. The current from the voltage-to-current converter 910 on the line 913 can have the form $I_0 + I_m \sin(\omega_m t)$.

The VCSEL diode 914 is thus driven to emit a laser light modulated as described above. Reflections of the modulated laser light may then be received back within the lasing cavity of VCSEL diode 914 and cause self-mixing interference. The resulting self-mixing interference light may be detected by photodetector 916. As described above, in such cases the photocurrent output of the photodetector 916 on the link 915 can have the form: $i_{PD} = i_0 + i_m \sin(\omega_m t) + \gamma \cos(\varphi_0 + \varphi_m \sin(\omega_m t))$. As the I/Q components to be used in subsequent stages are based on just the third term, the first two terms can be removed or reduced by the differential transimpedance amplifier and anti-aliasing (DTIA/AA) filter 918. To do such a removal/reduction, a proportional or scaled value of the first two terms is produced by the voltage divider 912. The voltage divider 912 can use as input the combined voltage signal on the link 909 produced by the circuit adder 908. The output of the voltage divider 912 on link 911 can then have the form: $\alpha(V_0+V_m \sin(\omega_m t))$. The photodetector current and this output of the voltage divider 912 can be the inputs to the DTIA/AA filter 918. The output of the DTIA/AA filter 918 can then be, at least mostly, proportional to the third term of the photodetector current.

The output of the DTIA/AA filter 918 may then be quantized for subsequent calculation by the analog-to-digital converter (ADC) block 920. Further, the output of the ADC block 920 may have a residual signal component proportional to the sine wave originally generated by the sine wave generator 904. To filter this residual signal component, the originally generated sine wave can be scaled (such as by the indicated factor of β) at multiplier block 924C, and then subtracted from the output of ADC block 920. The filtered output on link 921 may have the form: $A+B \sin(\omega_m t)+C \cos(2\omega_m t)+D \sin(3\omega_m t)+\ldots$, from the Fourier expansion $\gamma \cos(\varphi_0+\varphi_m \sin(\omega_m t))$ discussed above. The filtered output can then be used for extraction of the I/Q components by mixing.

The digital sine wave originally generated by sine wave generator 904 onto link 907 is mixed (multiplied) by the multiplier block 924a with the filtered output on link 907. This product is then low-pass filtered at block 928a to obtain the Q component discussed above, possibly after scaling with a number that is related to the amount of frequency modulation of the laser light and distance of the target.

Also, the originally generated digital sine wave is used as input into the squaring/filtering block 926 to produce a digital cosine wave at a frequency double that of the originally produced digital sine wave. The digital cosine wave is then mixed (multiplied) at the multiplier component 924b with the filtered output of the ADC block 920 on link 921. This product is then low-pass filtered at component 928b to obtain the I component discussed above, possibly after scaling with a number that is related to the amount of frequency modulation of the laser light and distance of the target.

The Q and the I components are then used by the phase calculation component 930 to obtain the phase from which the displacement of the target can be calculated, as discussed above.

One skilled in the art will appreciate that while the embodiment shown in FIG. 9 makes use of the digital form of the originally generated sine wave produced by sine wave generator 904 onto link 907, in other embodiments the originally generated sine wave may be an analog signal and mixed with an analog output of the DTIA/AA filter 918. In other implementations, the voltage divider 912 may be a variable voltage divider. In still other implementations, the voltage divider 912 may be omitted and the differential TIA and anti-aliasing filter 918 may be a single-ended differential TIA and anti-aliasing filter 918. In such an implementation, subtraction may be done only digitally by 922. In yet other implementations, 922 may be omitted and no subtraction of the modulation current may be performed.

The circuit of FIG. 9 can be adapted to implement the modified I/Q method described above that uses $Q' \propto \text{Lowpass}\{I_{PD} \times \sin(3\omega_m t)\}$. Some such circuit adaptations can include directly generating both mixing signals $\sin(2\omega_m t)$ and $\sin(3\omega_m t)$, and multiplying each with the output of the ADC block 920, and then applying respective low-pass filtering, such as by the blocks 928a,b. The differential TIA and anti-aliasing filter 918 may then be replaced by a filter to remove or greatly reduce the entire component of $I_{PD}$ at the original modulation frequency $\omega_m$. One skilled in the art will recognize other circuit adaptations for implementing this modified I/Q method. For example, the signal $\sin(3\omega_m t)$ may be generated by multiplying link 907 and the output of squaring/filtering block 926 and subsequently performing bandpass filtering to reject frequency components other than $3\omega_m t$.

In additional and/or alternative embodiments, the I/Q time domain based methods just described may be used with the spectrum based methods of the first family of embodiments. The spectrum methods of the first family can be used at certain times to determine the absolute distance to the target, and provide a value of $L_0$. Thereafter, during subsequent time intervals, any of the various I/Q methods just described may be used to determine $\Delta L$.

In additional and/or alternative embodiments, the spectrum methods based on triangle wave modulation of a bias current of a VCSEL may be used as a guide for the I/Q time domain methods. The I/Q methods operate optimally in the case that $J_1(b)=J_2(b)$, so that the I and Q components have the same amplitude. However, b depends on the distance L. An embodiment may apply a triangle wave modulation to the VCSEL's bias current to determine a distance to a point of interest. Then this distance is used to find the optimal peak-to-peak sinusoidal modulation of the bias current to use in an I/Q approach. Such a dual method approach may provide improved signal-to-noise ratio and displacement accuracy obtained from the I/Q method.

A DC bias mode, such as is illustrated in FIG. 6, may provide unsigned speed. A triangular mode, such as is illustrated in FIGS. 7 and 8, may provide velocity and absolute distance. A sinusoidal I/Q mode, such as illustrated in FIG. 9, may provide only displacement. DC bias mode may be used to estimate object motion (such as press/release of an object to another), but there may be ambiguities since the direction of motion may not be known. Triangular mode may obtain both speed and direction of motion. Velocity may then be integrated to obtain displacement. This integration result may also be coupled with absolute distance information for higher accuracy. However, as it is spectral domain analysis, it may be difficult to track slow movements (such as speeds bellow millimeters per second speeds). Sinusoidal I/Q mode may obtain displacement directly without integration and may also function when target motion is slow. However, this mode may require a higher signal-to-noise ration as a result of being a time-domain measurement technique.

In various implementations, an input device may include an enclosure defining a three-dimensional input space; a self-mixing interferometry sensor coupled to the enclosure and configured to emit a beam of coherent light from an optical resonant cavity to illuminate a body part in the three-dimensional input space, receive a reflection or backscatter of the beam into the optical resonant cavity, and produce a self-mixing interferometry signal resulting from self-mixing of the coherent light within the optical resonant cavity; and a processor. The processor may be configured to determine a body part displacement or a body part speed and an absolute distance to the body part using the self-mixing interferometry signal, and determine an input using the body part displacement or the body part speed and the absolute distance.

In some examples, the input may correspond to a touch of the body part to an object. In various such examples, the processor may estimate an amount of force exerted on the object by the body part.

In a number of examples, the self-mixing interferometry sensor may be configured to emit the beam at an oblique angle with respect to a wall of the enclosure. In some examples, the self-mixing interferometry sensor may be configured to emit the beam normal with respect to a wall of the enclosure. In a number of examples, the enclosure may be configured to be mounted on the body part. In various examples, the enclosure may be configured to provide a gap between the self-mixing interferometry sensor and the body part.

In some implementations, an input device may include an enclosure defining a three-dimensional input space; a first self-mixing interferometry sensor coupled to the enclosure and configured to emit a first coherent light beam from a first optical resonant cavity to illuminate a body part in the three-dimensional input space, receive a first reflection or backscatter of the first coherent light beam into the first optical resonant cavity, and produce a first self-mixing interferometry signal; a second self-mixing interferometry sensor coupled to the enclosure and configured to emit a second coherent light beam from a second optical resonant cavity to illuminate the body part in the three-dimensional input space, receive a second reflection or backscatter of the second coherent light beam into the second optical resonant cavity, and produce a second self-mixing interferometry signal; and a processor. The processor may be configured to determine movement of the body part by analyzing differences between the first self-mixing interferometry signal and the second self-mixing interferometry signal and determine an input using the movement.

In various examples, the first self-mixing interferometry sensor and the second self-mixing interferometry sensor may be positioned on opposing sides of the three-dimensional input space. In some such examples, the movement may be lateral movement of the body part between the first self-mixing interferometry sensor and the second self-mixing interferometry sensor.

In a number of examples, the processor may screen out a false input using differences between the first self-mixing interferometry signal and the second self-mixing interferometry signal. In various examples, the movement of the body part may be deformation of a fingernail. In a number of examples, the first self-mixing interferometry sensor may include an optical component configured to tilt the first beam. In some examples, the movement may correspond to withdrawal of the body part from the enclosure.

In a number of embodiments, an input system may include an enclosure defining a three-dimensional input space; a self-mixing interferometry sensor coupled to the enclosure and configured to emit a beam of coherent light from an optical resonant cavity to illuminate a body part in the three-dimensional input space, receive a reflection or backscatter of the beam into the optical resonant cavity, and produce a self-mixing interferometry signal resulting from self-mixing of the coherent light within the optical resonant cavity; and a processor. The processor may be configured to determine movement of the body part using the self-mixing interferometry signal and determine an input using the movement.

In some examples, the self-mixing interferometry sensor may be a component of a first electronic device and the processor may be a component of a second electronic device that communicates with the first electronic device. In various examples, the processor may be a component of a first electronic device and transmit the input to a second electronic device.

In a number of examples, the input may be selection of a virtual key of a virtual keyboard. In various examples, the movement may be at least one of an expansion of the body part or a contraction of the body part. In some examples, the input may correspond to movement of the body part along a surface.

As described above and illustrated in the accompanying figures, the present disclosure relates to an input device including an enclosure defining a three-dimensional input space and one or more self-mixing interferometry sensors coupled to the enclosure and configured to produce a self-mixing interferometry signal resulting from reflection of backscatter of emitted light by a body part in the three-dimensional input space. In various examples, movement of the body part may be determined using the self-mixing interferometry signal, which may in turn be used to determine an input. In some examples, a body part displacement or a body part speed and an absolute distance to the body part may be determined using the self-mixing interferometry signal and used to determine an input. In a number of examples, multiple self-mixing interferometry sensors may be used and the movement may be determined by analyzing differences between the respective produced self-mixing interferometry signals.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:
1. An input device, comprising:
an enclosure defining a three-dimensional input space;
a self-mixing interferometry sensor coupled to the enclosure and configured to emit a beam of coherent light from an optical resonant cavity to illuminate a body part in the three-dimensional input space, receive a reflection or backscatter of the beam into the optical resonant cavity, and produce a self-mixing interferometry signal resulting from self-mixing of the coherent light within the optical resonant cavity; and a processor configured to:

determine a body part displacement or a body part speed and an absolute distance to the body part using the self-mixing interferometry signal;

determine an input using the body part displacement or the body part speed and the absolute distance, the input corresponding to a touch of the body part to an object; and estimate an amount of force exerted on the object by the body part.

2. The input device of claim 1, wherein the body part is a finger or a thumb.

3. The input device of claim 1, wherein the input corresponds to a virtual keyboard.

4. The input device of claim 1, wherein the self-mixing interferometry sensor is configured to emit the beam at an oblique angle with respect to a wall of the enclosure.

5. The input device of claim 1, wherein the self-mixing interferometry sensor is configured to emit the beam normal with respect to a wall of the enclosure.

6. The input device of claim 1, wherein the enclosure is configured to be mounted on the body part.

7. The input device of claim 1, wherein the enclosure is configured to provide a gap between the self-mixing interferometry sensor and the body part.

8. An input device, comprising:

an enclosure defining a three-dimensional input space;

a first self-mixing interferometry sensor coupled to the enclosure and configured to emit a first coherent light beam from a first optical resonant cavity to illuminate a body part in the three-dimensional input space, receive a first reflection or backscatter of the first coherent light beam into the first optical resonant cavity, and produce a first self-mixing interferometry signal;

a second self-mixing interferometry sensor coupled to the enclosure and configured to emit a second coherent light beam from a second optical resonant cavity to illuminate the body part in the three-dimensional input space, receive a second reflection or backscatter of the second coherent light beam into the second optical resonant cavity, and produce a second self-mixing interferometry signal; and a processor configured to:

determine movement of the body part by analyzing differences between the first self-mixing interferometry signal and the second self-mixing interferometry signal;

screen out a false input using the differences between the first self-mixing interferometry signal and the second self-mixing interferometry signal; and determine an input using the movement.

9. The input device of claim 8, wherein the first self-mixing interferometry sensor and the second self-mixing interferometry sensor are positioned on opposing sides of the three-dimensional input space.

10. The input device of claim 9, wherein the movement comprises lateral movement of the body part between the first self-mixing interferometry sensor and the second self-mixing interferometry sensor.

11. The input device of claim 8, wherein the input corresponds to a force applied to a surface.

12. The input device of claim 8, wherein the first self-mixing interferometry sensor includes an optical component configured to tilt the first coherent light beam.

13. The input device of claim 8, wherein the movement corresponds to withdrawal of the body part from the enclosure.

14. An input device, comprising:

an enclosure defining a three-dimensional input space;

a first self-mixing interferometry sensor coupled to the enclosure and configured to emit a first coherent light beam from a first optical resonant cavity to illuminate a body part in the three-dimensional input space, receive a first reflection or backscatter of the first coherent light beam into the first optical resonant cavity, and produce a first self-mixing interferometry signal;

a second self-mixing interferometry sensor coupled to the enclosure and configured to emit a second coherent light beam from a second optical resonant cavity to illuminate the body part in the three-dimensional input space, receive a second reflection or backscatter of the second coherent light beam into the second optical resonant cavity, and produce a second self-mixing interferometry signal; and a processor configured to:

determine movement of the body part by analyzing differences between the first self-mixing interferometry signal and the second self-mixing interferometry signal; and determine an input using the movement, the movement of the body part comprising deformation of a fingernail.

15. An input system, comprising:

an enclosure defining a three-dimensional input space;

a self-mixing interferometry sensor coupled to the enclosure and configured to emit a beam of coherent light from an optical resonant cavity to illuminate a body part in the three-dimensional input space, receive a reflection or backscatter of the beam into the optical resonant cavity, and produce a self-mixing interferometry signal resulting from self-mixing of the coherent light within the optical resonant cavity; and a processor configured to:

determine movement of the body part using the self-mixing interferometry signal;

determine an input using the movement, the input comprising selection of a virtual key of a virtual keyboard, the input corresponding to a touch of the body part to an object; and estimate an amount of force exerted on the object by the body part.

16. The input system of claim 15, wherein:

the self-mixing interferometry sensor is a component of a first electronic device; and the processor is a component of a second electronic device that communicates with the first electronic device.

17. The input system of claim 15, wherein the processor:

is a component of a first electronic device; and transmits the input to a second electronic device.

18. The input system of claim 15, wherein the input comprises a press.

19. The input system of claim 15, wherein the movement comprises at least one of an expansion of the body part or a contraction of the body part.

20. The input system of claim 15, wherein the input corresponds to the movement of the body part along a surface.

\* \* \* \* \*